(12) United States Patent
Coleman et al.

(10) Patent No.: US 6,704,619 B1
(45) Date of Patent: Mar. 9, 2004

(54) METHOD AND SYSTEM FOR UNIVERSAL GUIDANCE AND CONTROL OF AUTOMATED MACHINES

(75) Inventors: Norm Coleman, Picatinny Arsenal, NJ (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 10/453,963

(22) Filed: Jun. 3, 2003

Related U.S. Application Data

(60) Provisional application No. 60/473,085, filed on May 24, 2003.

(51) Int. Cl.$^7$ .............................................. G06F 19/00
(52) U.S. Cl. ................... 700/245; 700/172; 700/176; 700/180; 700/187; 700/189; 700/190; 700/177; 700/255; 701/23; 701/220; 701/221; 701/4; 701/200; 318/567; 318/568.1; 318/568.11; 318/568.13; 318/568.14; 714/11; 714/819
(58) Field of Search ................................. 700/177, 172, 700/126, 180, 187, 189, 245, 190, 255, 249, 257, 258, 259, 260; 701/23, 220, 221, 4, 200; 714/11, 819; 702/141; 600/595; 706/13; 114/382; 318/568.1, 568.11, 568.13, 568.14, 567

(56) References Cited

U.S. PATENT DOCUMENTS

| | | | | |
|---|---|---|---|---|
| 6,129,025 A | * | 10/2000 | Minakami et al. | 104/88.01 |
| 6,269,763 B1 | * | 8/2001 | Woodland | 114/382 |
| 6,272,479 B1 | * | 8/2001 | Farry et al. | 706/13 |
| 6,292,715 B1 | * | 9/2001 | Rongo | 700/249 |
| 6,456,939 B1 | * | 9/2002 | McCall et al. | 701/220 |
| 6,463,357 B1 | * | 10/2002 | An et al. | 700/245 |
| 6,516,283 B2 | * | 2/2003 | McCall et al. | 702/141 |
| 6,522,992 B1 | * | 2/2003 | McCall et al. | 702/141 |
| 2003/0120183 A1 | * | 6/2003 | Simmons | 600/595 |

* cited by examiner

Primary Examiner—William A. Cuchlinski, Jr.
Assistant Examiner—McDieunel Marc
(74) Attorney, Agent, or Firm—Raymond Y. Chan; David and Raymond Patent Group

(57) ABSTRACT

A system for universal guidance and control of automated machines incorporates with an IMU (Initial Measuring Unit) installed at an end effector of a motion element of an automated machine, fast-response feedback control for both position and angle servo-loops (for the end effector) greatly decreases the operational time needed to complete a pre-planned trajectory. In addition, the closed-control loop design provides stabilization and isolation of the end effector from external disturbances. This unique navigation solution is based upon the uses of a set of equations performing an open loop computation with the inertial data as its input. This formulation of equations requires a periodic update of the open loop solution in order to bind the growth of system errors. The source of this update is the automated machine position measurement derived from the mechanical sensors in the system.

51 Claims, 15 Drawing Sheets

METHOD AND SYSTEM FOR UNIVERSAL GUIDANCE AND CONTROL OF AUTOMATED MACHINES

CROSS REFERENCE OF RELATED APPLICATION

This is a regular application of a provisional application, application Ser. No. 60/473,085, filed May 24, 2003.

TECHNICAL FIELD

This invention was made with Government support under Contract No. DAAE30-02-C-1016 awarded by the U.S. Army Armament Research, Development and Engineering Center, Picatinny Arsenal, N.J. 07806. The Government has certain rights in the present invention.

BACKGROUND OF THE INVENTION

1. Field of the Invention

The present invention relates to a method and system for universal guidance and control of automated machines, and more particularly to a precision operational method and system for universal guidance and control of automated machines, wherein output data of an inertial sensor package installed in the grip or claw of the automated machine in conjunction with the use of an object detection system that ascertains the presence of object(s) and position and motion information from an integrated navigator system which provides the information to the guidance processor system that, in turn, generates the guidance commands to the automated machine with electromechanical servo actuator valves and the surrounding control loops to precisely control the movement of a motion element such as a grip or claw of the automated machine.

2. Description of Related Arts

Various automated machines, such as robots, smart cranes, etc., are being developed to facilitate automated operations, production, and processes. However, it's still a challenge to design highly accurate operational controls for an automated machine.

The automated machine is configured with several major linkages, which produce the gross motion of the end effector. Without feeding back the motion sensed at the end effector, manipulation of its position and orientation has to be done at a slow speed and requires extensive operators' assistance.

SUMMARY OF THE INVENTION

It is a main objective of the present invention to provide a method and system for universal guidance and control of automated machines, wherein a micro IMU (such as the U.S. Pat. No. 6,456,939 entitled "Micro Inertial Measurement Unit", U.S. Pat. No. 6,516,283 entitled "Core Inertial Measurement Unit" and U.S. Pat. No. 6,522,992 entitled "Core Inertial Measurement Unit" and the U.S. patent pending application Ser. No. 10/017,310 filed on Oct. 22, 2001, entitled "Micro Inertial Measurement Unit") is incorporated, so that the acceleration, velocity, angle rate, and angle of the grip or claw of the automated machine are all commanded with high accuracy, and effects from the mechanical portions of the loop, such as the mechanical flexing and bending due to loading, and nonlinear torques due to hydraulic components are minimized.

Another objective of the present invention is to provide a method and system for universal guidance and control of automated machines that enables autonomous/intelligent control of the automated machine's end effector by incorporating an IMU to permit direct servo-control of the end effector's acceleration, velocity, angular rate, and angle. This closed-loop system minimizes effects of such disturbances as mechanical flexing and bending due to loading and nonlinear torques due to hydraulic components.

Another objective of the present invention is to provide a method and system for universal guidance and control of automated machines, wherein control loops are formed through the use of actuators and outputs of the IMU linked with software for enhanced performance and agile operation of the automated machine.

Another objective of the present invention is to provide a method and system for universal guidance and control of automated machines, wherein the application aspects of the IMU are designed to enhance manual and automatic control of the machine. The use of the IMU is applied within the context of control loops that can enhance the machine's motion profiles.

Another objective of the present invention is to provide a method and system for universal guidance and control of automated machines, wherein the IMU is totally self sufficient to provide all data necessary for motion measurement of the machine.

Another objective of the present invention is to provide a method and system for universal guidance and control of automated machines, wherein the control loops are configured starting with an inner loop and expanding the functionality with successive layers of outer loops.

Another objective of the present invention is to provide a method and system for universal guidance and control of automated machines, wherein optimal heading measurements for the automated machines is addressed, which demonstrates accurate relative heading measurements for the grip or claw control or safety monitor. This is because only relative heading change measurement of the grip or claw is actually needed for automated machine operation control. For automated machine autonomous guidance navigation and control (GNC), for example, when the machine moves from one location to another location, the true heading measurement is still available.

Another objective of the present invention is to provide a method and system for universal guidance and control of automated machines, wherein the IMU is complemented with sensors, including object detection system, to isolate objects of interest, GPS receiver to effect AHRS/INS/GPS Integration unit to provide the isolated object(s), position and motion information to the object tracking and guidance system processor which, in turn, sends the commands to the central control processor to effect enhanced guidance and control of the machine.

In order to accomplish the above objectives, an IMU is installed at an end effector of a motion element of an automated machine, fast-response feedback control for both position and angle servo-loops (for the end effector) greatly decreases the operational time needed to complete a pre-planned trajectory. In addition, the closed-control loop design provides stabilization and isolation of the end effector from external disturbances.

The application of the IMU as a sensor for providing velocity and position of the tool with respect to the base of the automated machine expressed in the navigation (earth fixed) frame requires the use of specific processing methods and software in order to form the navigation solution.

This unique navigation solution is based upon the use of a set of equations performing an open loop computation with the inertial data as its input. This formulation of equations requires a periodic update of the open loop solution in order to bind the growth of system errors. The source of this update is the automated machine position measurement derived from the mechanical sensors in the system.

The performance enhancements gained by obtaining an inertially referenced solution to the position data is to increase the devices bandwidth, to remove the effects of mechanical compliance and resonance, and to provide an earth fixed reference for the sensed motion of the automated machine.

DETAILED DESCRIPTION OF THE PREFERRED EMBODIMENT

Figure 1:
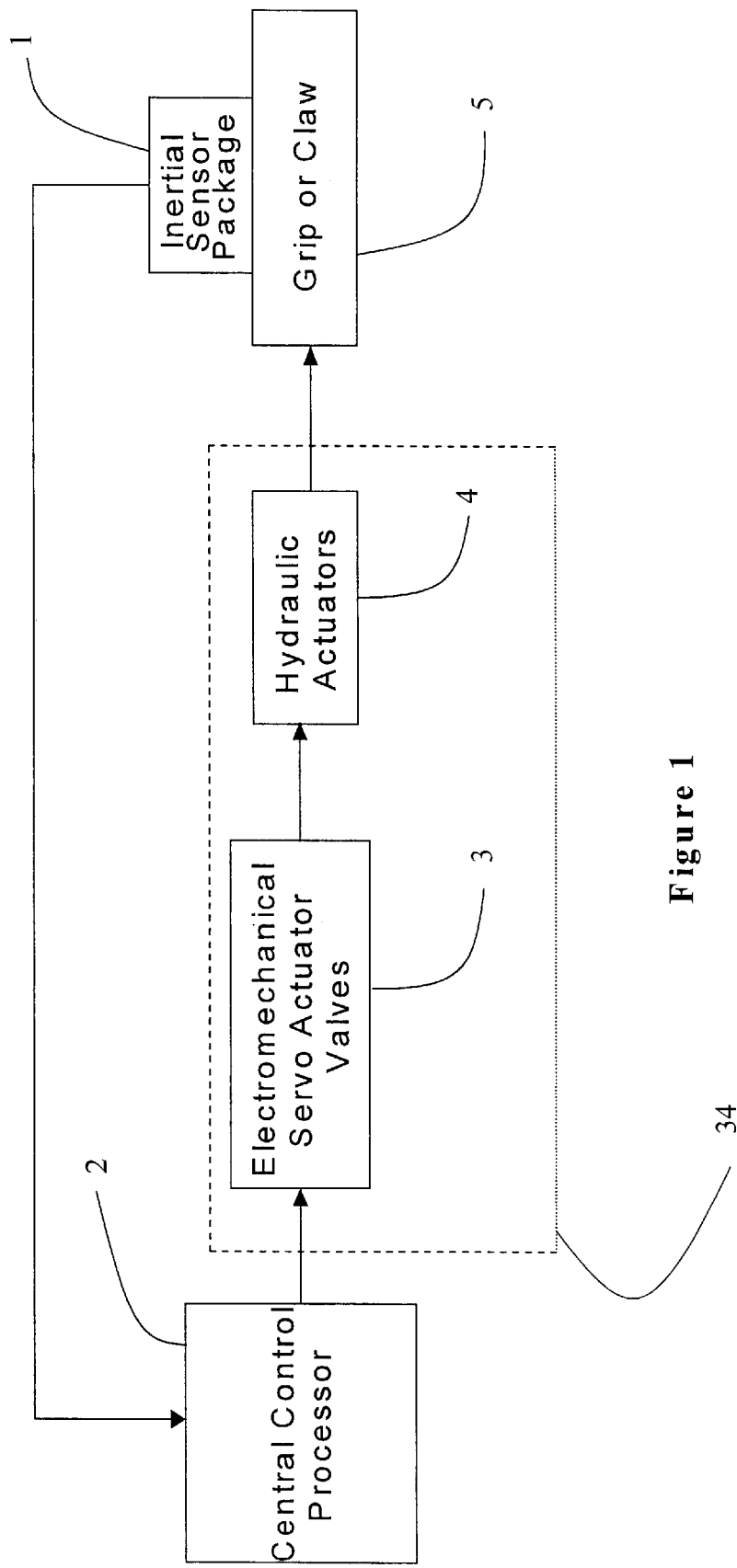
FIG. 1 is a block diagram illustrating a generic system configuration according to a preferred embodiment of the present invention.

Referring to FIGS. 1 to 15, a system for precision operational control of automated machines according to a preferred embodiment of the present invention is illustrated, which comprises a motion element 5 such as a holding element like a grip or claw, an inertial sensor package 1 installed at an end effector of the motion element 5 for sensing and providing a motion measurement of the motion element 5, a central control processor 2 receiving output of the inertial sensor package and producing commands, a motion actuator 34 receiving the commands from the central control processor 2 to control the movement of the end effector of the motion element 5, and an object tracking and guidance system processor 6 receiving information on the presence of objects of interest from the object detection system 7 and position and motion information from the AHRS/INS/GPS Integration Unit 8 with GPS receiver 9 as input.

According to the preferred embodiment as shown in FIG. 1, the motion actuator 34 is embodied to include one or more electromechanical servo actuator valves 3 and one or more hydraulic actuators 4 which is controlled by the electromechanical servo actuator valves 3, wherein the central control processor 2 receives output of the inertial sensor package 1 and produces commands to the electromechanical servo actuator valves 3 to control the hydraulic actuators 4 for making the motion element 5 move.

Referring to FIG. 1, the operational process of the system comprises the steps of:

(1) sensing a motion and motion changes of the end effector 51 of the motion element 5, i.e. the grip or claw, by the inertial sensor package 1;

(2) providing an accurate motion measurement of the end effector 51 of the motion element 5 through a navigation processing by the inertial sensor package to obtain measurement data;

(3) sending the measurement data from the inertial sensor package 1 to the central control processor 2;

(4) receiving the measurement data from the inertial sensor package 1 by the central control processor 2;

(5) comparing the measurement data with a command input to form error data;

(6) receiving the error data in the central control processor;

(7) producing a control signal by using a controller algorithm in the central control processor 2;

(8) sending the control signal to the motion actuator 34 to control speed and force outputs of motion actuator 34; and (9) driving the end effector 51 of the motion element 5 (grip or claw) by the motion actuator 34 according to the control signal, wherein under the control, the error between the measured motion and the input command converges to zero. That is, the end effector of the motion element 5 moves along a trajectory as the input command requires. Because of a closed-control loop system and method are used, the interference to the end effector motion inside the loop is diminished.

According to the preferred embodiment, in the step (8), the control signal is sent to the electromechanical servo actuator valves 3 to control the hydraulic flow to the hydraulic actuators 4 (hydraulic motors) so that the speed and force outputs of the hydraulic actuators 4 are controlled.

Moreover, in the step (9), the end effector of the motion element 5 (grip or claw) is driven by the hydraulic actuators 5 according to the control signal, wherein under the control, the error.

Figure 2:
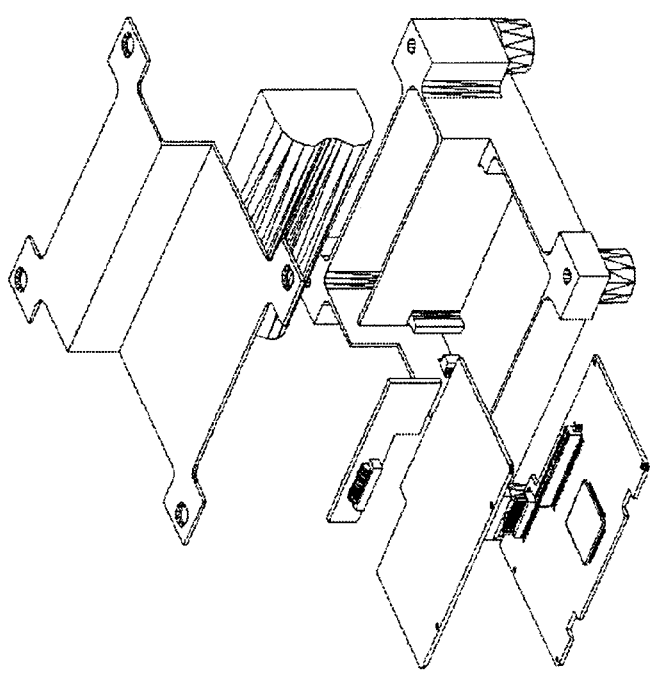
FIG. 2 is an exploded perspective view illustrating an inertial sensor package according to the above preferred embodiment of the present invention.

Referring to FIG. 1, with the addition of an inertial sensor package shown in FIG. 2, the electromechanical servo actuator valves 3, and the surrounding control loops, the movement of the motion element 5 can be precisely controlled. Because the acceleration, velocity, angle rate, and angle are all commanded with high accuracy, effects from the mechanical portions of the control loop, such as the mechanical flexing and bending due to loading, and nonlinear torques due to hydraulic components are minimized. This enables an operator to obtain the best performance allowed by the mechanical segments of the mechanism.

Figure 3:
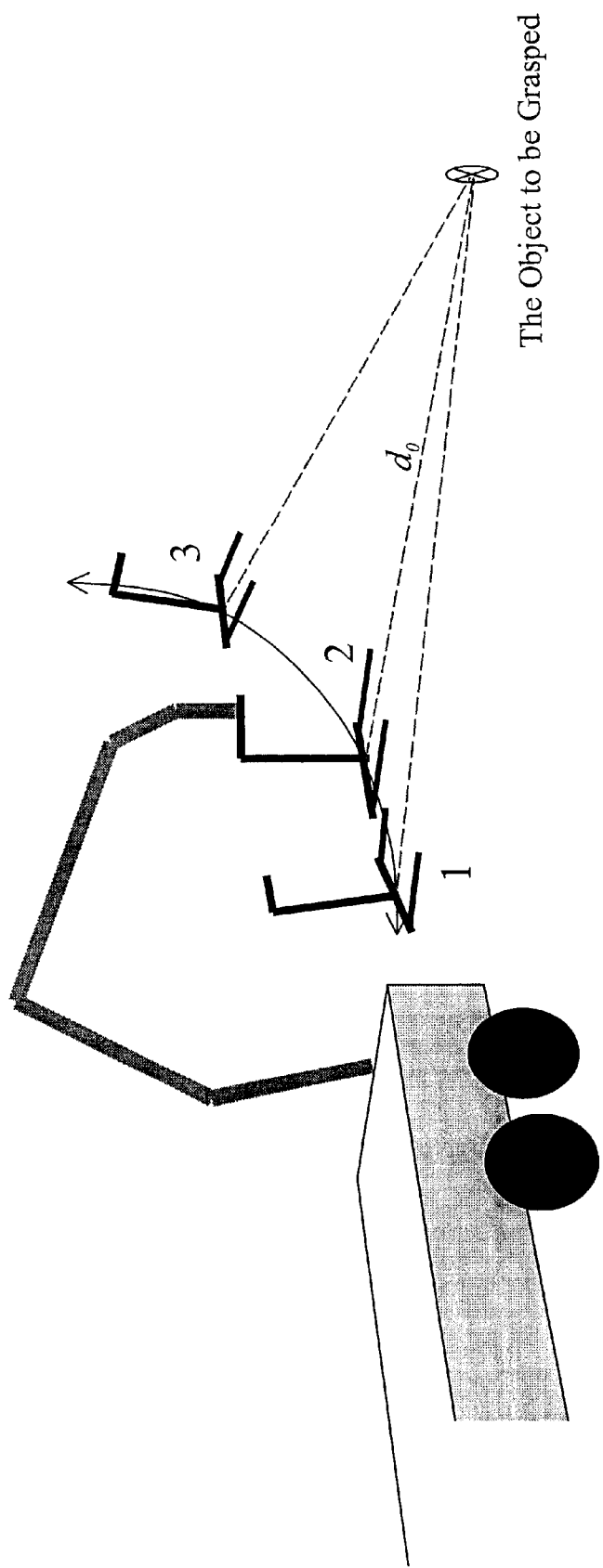
FIG. 3 is a schematic view illustrating an application for automated machine pointing stabilization according to the above preferred embodiment of the present invention.

FIG. 3 depicts an application of the present invention for pointing stabilization. The control system automatically reorients the end effector of the motion element 5 while translating the arm. So it keeps pointing to the object to be grasped, whether it is at position 1, 2 or 3. The inertial position is updated using only IMU's gyro/accelerometer outputs for feedback. The attitude errors (from an initial reference) are computed for roll/pitch/yaw servo-control. The benefits of a closed-control loop design using the IMU include: improved pointing stabilization for a vision system and speed of operations; ability to continuously orient the end effector of the motion element 5 to a fixed reference without a vision system; availability of inertial navigation solutions for other usages (e.g., collision avoidance, cargo handling, real-time trajectory-planning, etc.).

The feedback control system relies on the control processor to produce the commands to the electromechanical servo actuator valves 3 based on data received from the inertial sensor package 1; the electromechanical servo actuator valves 3 control the hydraulic actuators 4 that make the end effector of the motion element 5 move, and the inertial sensor package 1 installed at the end effector of the motion element 5 senses the motion.

As an application example, the effector motion is described by the following specifications of its performance when sensed by the AGNC®-2000CMIMU coremicro® IMU (U.S. Pat. No. 6,522,992 entitled "Core Inertial Measurement Unit"):

| | |
|---|---|
| Velocity accuracy | 0.08 Ft/sec |
| Angular accuracy | 0.1 deg after initial alignment |
| Position accuracy relative to the base | 0.75 inch |
| Bandwidth | 50 Hz |

The velocity accuracy is derived assuming a 2 sec system update rate (0.5 Hz). The assumed error in acceleration is 0.00125 g or 1.25 milig. Derived from the angular tilt of the leveling loop and the other long list of lessor errors.

$$0.00125\ G*32.141\ FT/sec**2/G*2\ sec=0.0803\ FT/SEC$$

The Position accuracy relative to the base is derived from the linear acceleration error of 0.001 G.

$$0.5*0.001\ G*32.14\ ft/sec/G*(2\ sec)**2*12\ in/ft=0.77\ inch$$

The angular accuracy is derived from the RSS of the Angle rate noise, the axis misalignment, and the mounting angular misalignment.

The angle derived from the angle rate noise is 0.07 deg/sec/rt-Hz*(0.5 Hz)**0.5*2 sec=0.0989 deg, where 0.5 Hz is the correlation time of 2 seconds or 0.5 Hz. Two seconds is the update rate for the time interval of the system. The mounting accuracy is 0.15 deg. The axis misalignment is derived from the uncompensated orthogonality error of 0.005 deg and the maximum turn rate of 100 deg/sec*2 sec for the update period.

$$0.005\ deg*100\ deg/sec*2\ sec*0.017\ rad/deg\ \text{for the misalignment}=0.017\ Deg$$

Therefore the RSS of the terms is from 0.0989 deg, 0.15 deg, and 0.017 deg $$SQRT((0.09892)+(0.152)+(0.017**2))=0.18\ \text{deg of angular accuracy}$$

The loop bandwidth is assumed to be limited by the characteristics of the electrohydraulic actuator valve in that the gyro bandwidth is about 700 Hz.

Note that performance enhancement can be realized without upgrading other costly components of the automated machine. By directly measuring the end effector motion, less costly linear and angular motion sensors for various links and joints can be utilized.

The incorporation of the IMU also engenders a variety of autonomous/intelligent operations for automated machines:

1. Optimized Trajectory Planning and Autonomous Operations—Making use of the motion state data for trajectory planning. After achieving stabilized response of the end effector of the motion element 5, the operator no longer needs to closely monitor the motions of the machine, and input commands can be structured for semiautonomous/autonomous operations.

2. Safety/Fault Monitoring—Important safety monitoring can be achieved by comparing the short-term navigation solution derived from the inertial sensors package 1 with the position and velocity estimates derived from the mechanical sensors. When the two solutions differ by more than a small amount, the system can be shut down.

3. Inertial Reference Database—Navigation solution can be stored in a database for geographic referencing of handled cargo items. Inertial orientation of cargo can be determined by resolving optical image data into an earth-fixed navigation frame of reference. The data is also available for the operator's use in commanding the machine.

4. Adaptive Gain Scheduling—Cargo mass and moment of inertia can be determined by estimating the closed loop time constants online from motion command inputs and sensed motion outputs at the end effector of the motion element 5. This information can then be used to schedule appropriate control gains to optimize performance.

5. Collision Avoidance—By making use of pre-existing navigation data, collision avoidance can be realized.

6. Robust Control—Operation of the end effector of the motion element 5 in a semiautonomous/autonomous mode is possible while the machine makes small maneuvering motions.

According to the preferred embodiment, the inertial sensor package 1 is embodied as an IMU which comprises an accelerometer 11, a navigation module 12, a fixed level arm 13, a gyro 14, and an AHRS module 15.

The application of the AGNC®-2000CMIMU coremicro® IMU or any other IMU to the automated machine includes the generation of control loops for enhanced performance and agile operation. These loops are formed through the use of actuators and the IMU linked with software. The inertial sensors package, AGNC®-2000CMIMU coremicro® IMU for the automated machine application is totally self contained including miniature size IMU, wireless transmitter, case, and battery.

The actuation of the mechanical links of the crane is accomplished through hydraulic actuators that are controlled with electromechanical servo actuator valves. These valves are very low power devices with a large power gain. They are driven with the output of a typical op amp, with about 5 ma and −10 to +10 volts. These actuator valves can provide very predictable and linear source of pressure with a moderate bandwidth.

This configuration eliminates the inherent reliability problems found with cabling and connectors while lowering installation costs.

The control loops are configured starting with an inner loop and expanding the functionality with successive layers of outer control loops, comprising:

(a) an acceleration control loop;
(b) a velocity control loop;
(c) a position control loop;
(d) an angular rate control loop; and
(e) an angle control loop.

Figure 4:
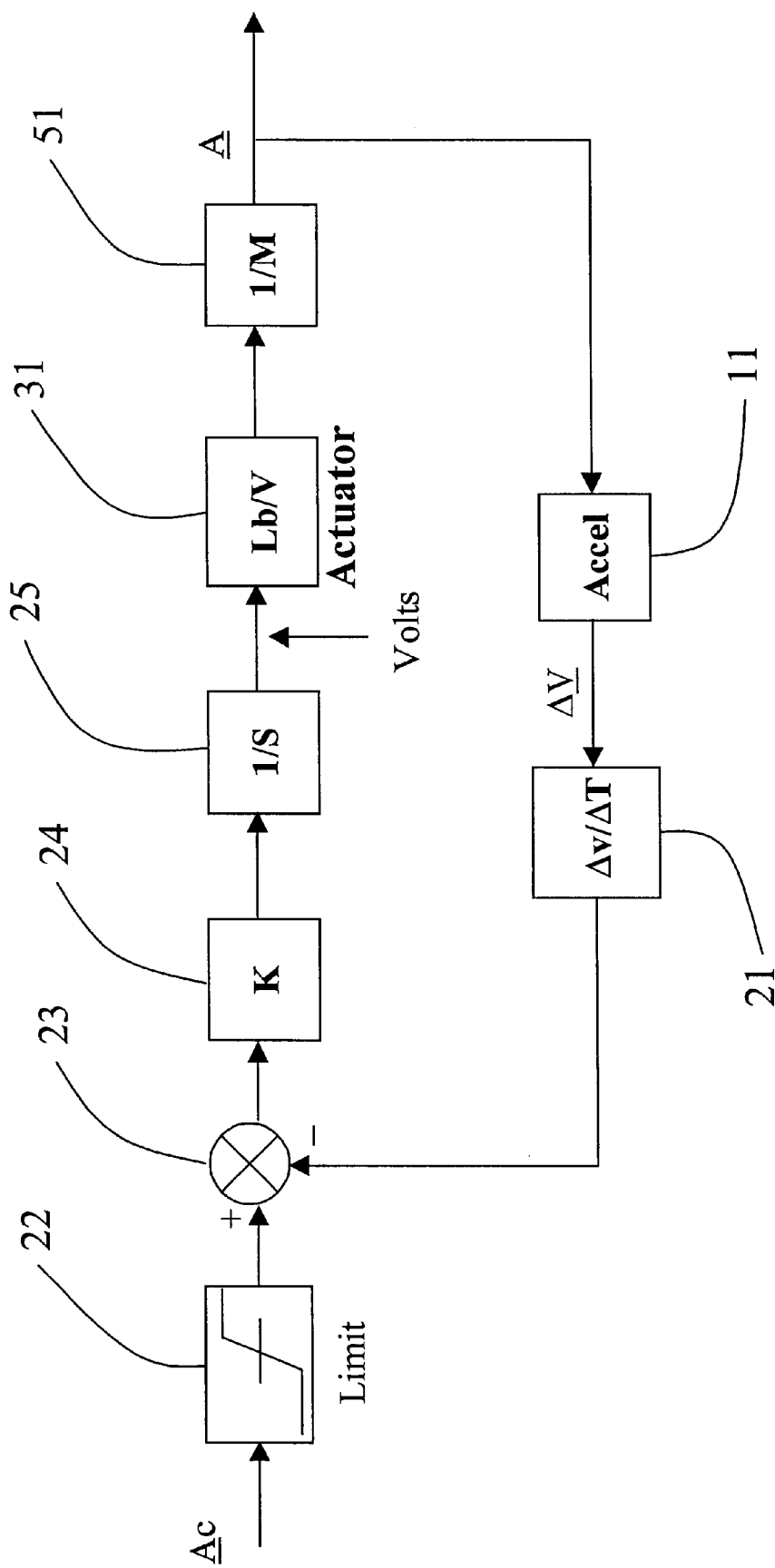
FIG. 4 is la block diagram illustrating an acceleration loop according to the above preferred embodiment of the present invention.

The primary inner control loop is a first order acceleration control loop as shown in FIG. 4. The input consists of a commanded acceleration in three axes with the output acceleration sensed with the IMU. The input command is limited in order to restrict the magnitude of the force generated by the motion actuator 31.

Referring to FIG. 4, the acceleration control loop 29 comprises accelerometers 11 of the IMU 1 for measuring real motion, a converter 21 for converting delta velocity data to acceleration data, a first limit 22 for restricting the magnitude of the force, a first comparator 23 for comparing the acceleration command and measured acceleration, a first amplifier 24 for signal amplifying, and an integrator 25 for signal interation. The processor produced voltage signal is sent to the motion actuator 31 for driving the end effector 51.

The method of acceleration control processing comprises the following steps:

(1) measuring an acceleration of the end effector 51 and producing delta velocity data by the accelerometers 11 of the IMU 1;
(2) sending the delta velocity data to the converter 21 in the central control processor 2;
(3) converting the delta velocity data to acceleration data;
(4) inputting the acceleration command signal and limiting it with the first limit 22 and producing bounded acceleration commands;
(5) comparing the limited input acceleration command with the measured acceleration and producing an acceleration error signal by the first comparator 23;
(6) simplifying the acceleration error signal by the first amplifier 24 and then integrating the amplified signal by the integrator 25;
(7) converting the output of the integrator 25 to an analog voltage signal and sending it to the motion actuator 34; and
(8) producing force according to the input signal by the motion actuator 31 and driving the end effector 51 to move so that the acceleration error converges to zero.

Figure 5:
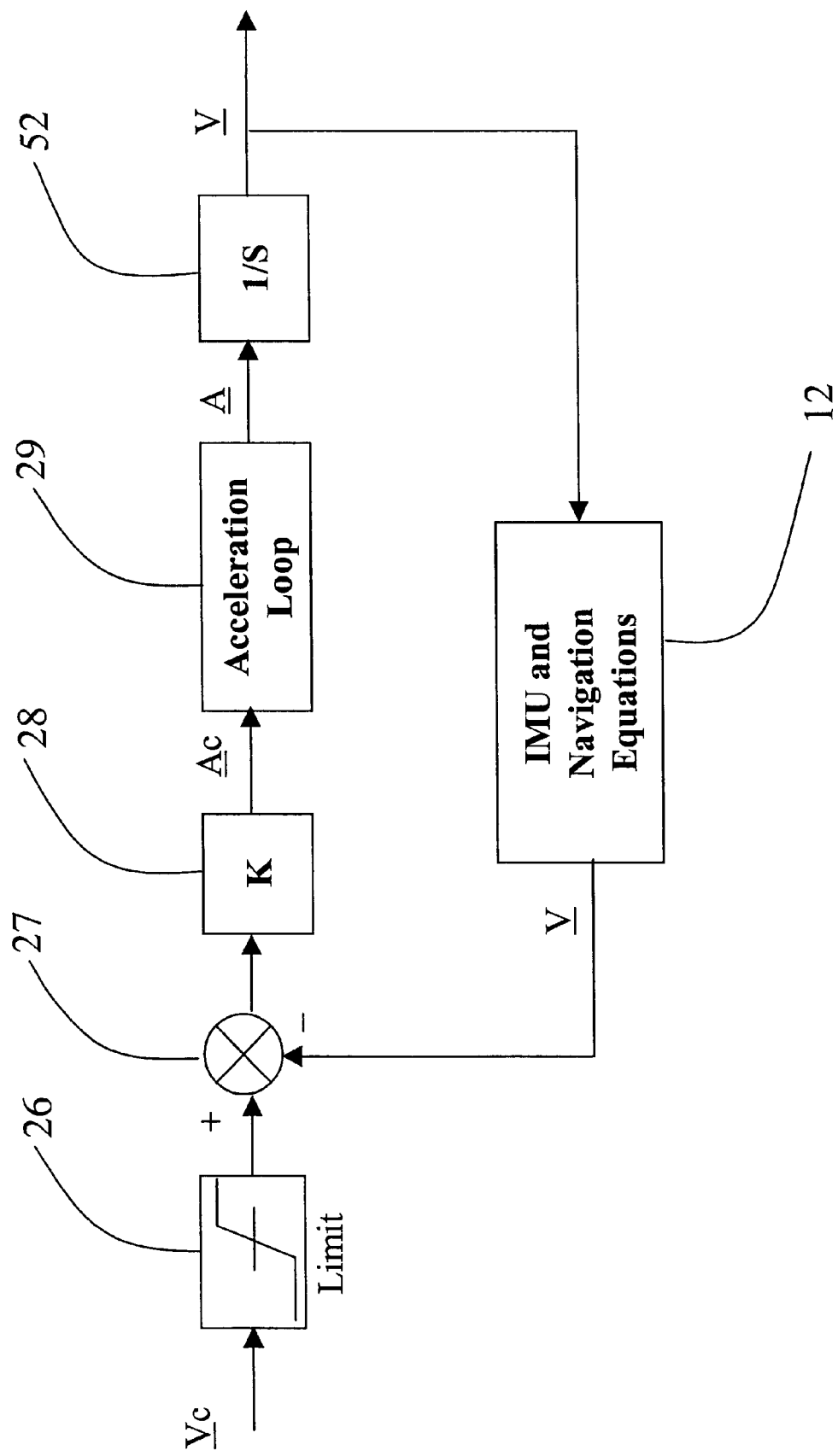
FIG. 5 is a block diagram illustrating a velocity loop according to the above preferred embodiment of the present invention.

Based on the acceleration control loop 29 as shown in FIG. 4, the velocity control loop 213 is built as shown in FIG. 5. The velocity control loop 213 makes use of the acceleration control loop 29 as an inner control loop. This is the first order velocity control loop 213 as shown in FIG. 5 and is realized entirely within the processing module. With the implementation of this control loop, velocity is commanded with respect to the fixed base of the machine and is sensed by the combination of the IMU and navigation equations derived with the constraints of known mechanical links and with the aid of the angular rate control loop.

Referring to FIG. 5, the velocity processing control loop 213 comprises the IMU 1 and its navigation module 12 including processing algorithms for obtaining the real velocity of the end effector 51, a second limit 26 for restricting the magnitude of the velocity, a second comparator 27 for comparing the velocity command and measured velocity, and a second amplifier 28 for signal amplifying. The velocity processing produced data are sent to the acceleration control loop 29 as the input acceleration command for driving the end effector 51 in which the velocity control loop 213 acts as an integrator to transform acceleration to velocity.

The method of velocity control processing comprises the following steps:

(1) measuring a velocity of the end effector 51 by the navigation module of the IMU 1;
(2) processing the output data of IMU 1 by using the navigation processing algorithms of the navigation module 12 and producing velocity measurements of the end effector 51;
(3) limiting the input velocity command signal by the second limit 26 and producing limited velocity data;
(4) comparing the limited input velocity data with the measured velocity from the IMU 1 by the second comparator 27 and producing velocity error signal;
(5) amplifying the velocity error signal by the second amplifier 28;
(6) sending the output of the second amplifier 28 to the input of the acceleration control loop 29; and
(7) producing force by the motion actuator according to the input signal.

Through the acceleration control loop 29 and driving to the end effector 51, motion is generated so that the velocity error converges to zero.

Figure 6:
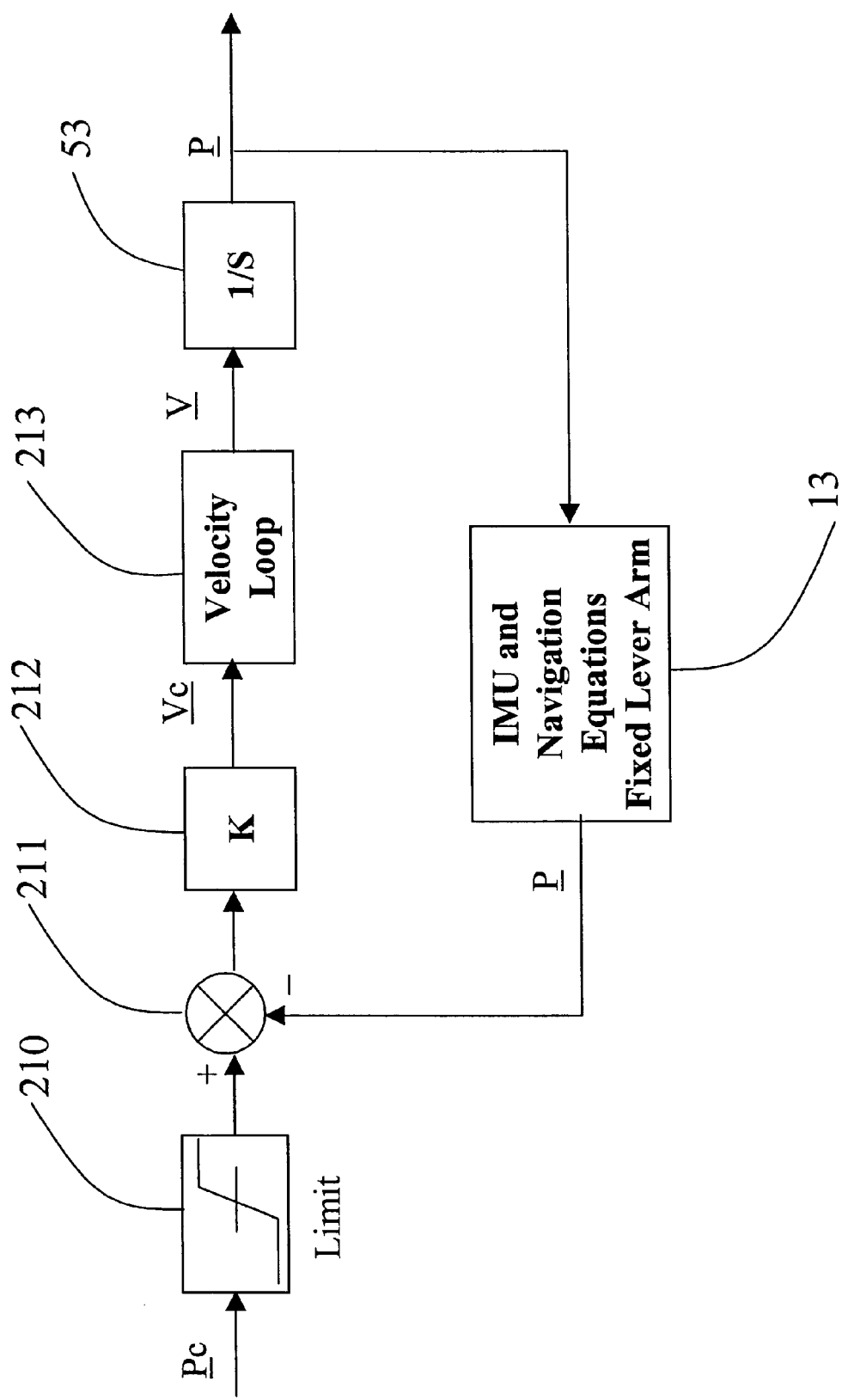
FIG. 6 is a block diagram illustrating a position loop according to the above preferred embodiments of the present invention.

The position control loop as illustrated in FIG. 6 makes use of the velocity control loop 213 as an inner loop. This is a first order position control loop as shown in FIG. 6 and is realized entirely within the processing module. With the implementation of this loop, position is commanded with respect to the fixed base of the machine and is sensed by the combination of the IMU 1 and navigation modules derived with the constraints of known mechanical links and the aid of the gimbal angles as sensed by the attitude derived in the AHRS equations.

Referring to FIG. 6, the position processing loop comprises the IMU 1 and its processing for obtaining the real position of the end effector 51, a third limit 210 for restricting the magnitude of the position, a third comparator 211 for comparing the position command and measured position, and a third amplifier 212 for error signal amplifying. The position processing produced data are sent to the velocity control loop 213 as the input velocity command for driving the end effector 51 in which the position loop acts as an integrator to transform velocity to position.

The method of position control processing comprises the following steps:

(1) measuring a position of the end effector 51 by the IMU 1;
(2) estimating the position by using a fixed lever arm parameter 13;
(3) processing the output data of the IMU 1 by using navigation algorithms and producing position measurement of the end effector 51;

(4) limiting the input position command signal by the third limit 210 and producing limited position data;

(5) comparing limited input position data with the measured position from the IMU 1 by the third comparator 211 and producing position error signal;

(6) amplifying the position error signal by the third amplifier 212;

(7) sending the output of the third amplifier 212 to the input of the velocity control loop 213.

Through the velocity control loop 213, the motion actuator produces force according to the input signal and drives the end effector 51 to move so that the position error converges to zero.

Figure 7:
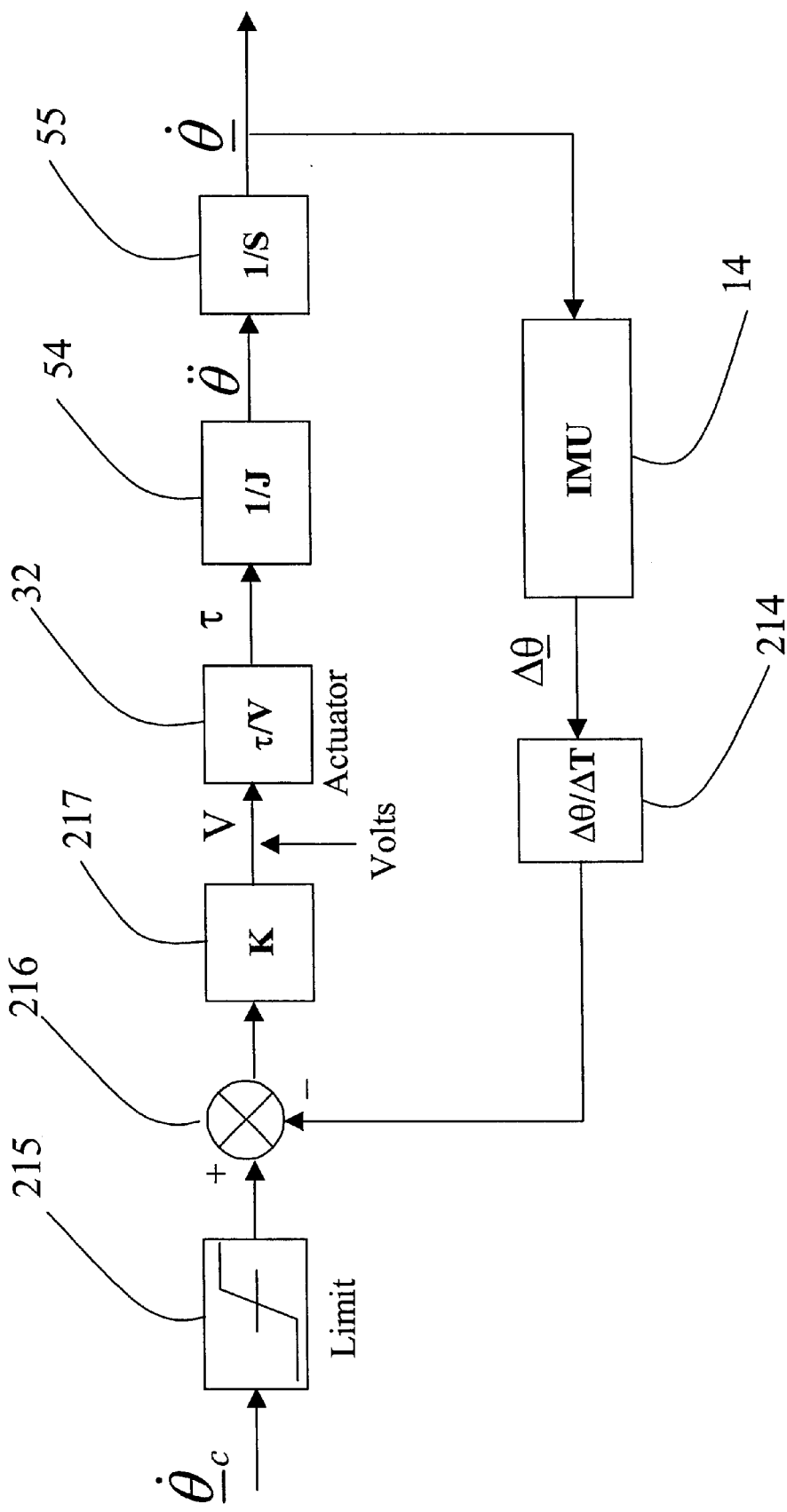
FIG. 7 is a block diagram illustrating an angular rate loop according to the above preferred embodiment of the present invention.

The angular rate control loop consists of an inner loop and successive layers of outer loops. The primary inner loop is a first order angular rate loop as shown in FIG. 7. The input consists of a commanded angular rate in three axes with the output angular rate sensed with the IMU. The input command is limited in order to restrict the magnitude of the torque generated by the motion actuator.

Referring to FIG. 7, the angular rate control loop 221 comprises the IMU 1 and its gyros 14 for obtaining a real angular rate of the end effector 51, a fourth limit 215 for restricting the magnitude of the angular rate, a fourth comparator 216 for comparing the angular rate command and measured angular rate, and a fourth amplifier 217 for signal amplifying. The angular rate processing produced data are sent to the end effector 51 for driving the end effector 51 in which the angular rate control loop 221 acts as an integrator to transform angular acceleration to angular rate.

The method of angular rate control processing comprises the following steps:

(1) measuring the angular motion of the end effector 51 by the gyros 14 in IMU 1;

(2) outputting angular data of the gyros in forms of delta angles;

(3) converting the delta angle data to angular rate data by an angular rate converter 214;

(4) limiting the input angular rate command signal by fourth limit 215 and producing limited angular rate data;

(5) comparing the limited input angular rate data with the measured angular rate from the angular rate converter 214 by the fourth comparator 216 and producing angular rate error signal;

(6) amplifying the angular rate error signal by the fourth amplifier 217;

(7) converting the output of the fourth amplifier 217 to analog signal and sending it to the input of motion actuator 34; and (8) producing torque/force that exerts on the end effect 51 by the motion actuator 34 and producing angular acceleration that makes the angular rate error converges to zero.

The angular acceleration is accumulated by the angular rate control loop 221 and produces angular rate. Through the angular rate control loop 221, the motion actuator 34 produces force according to the input signal and drives the end effector 51 to move so that the angular rate error converges to zero.

Figure 8:
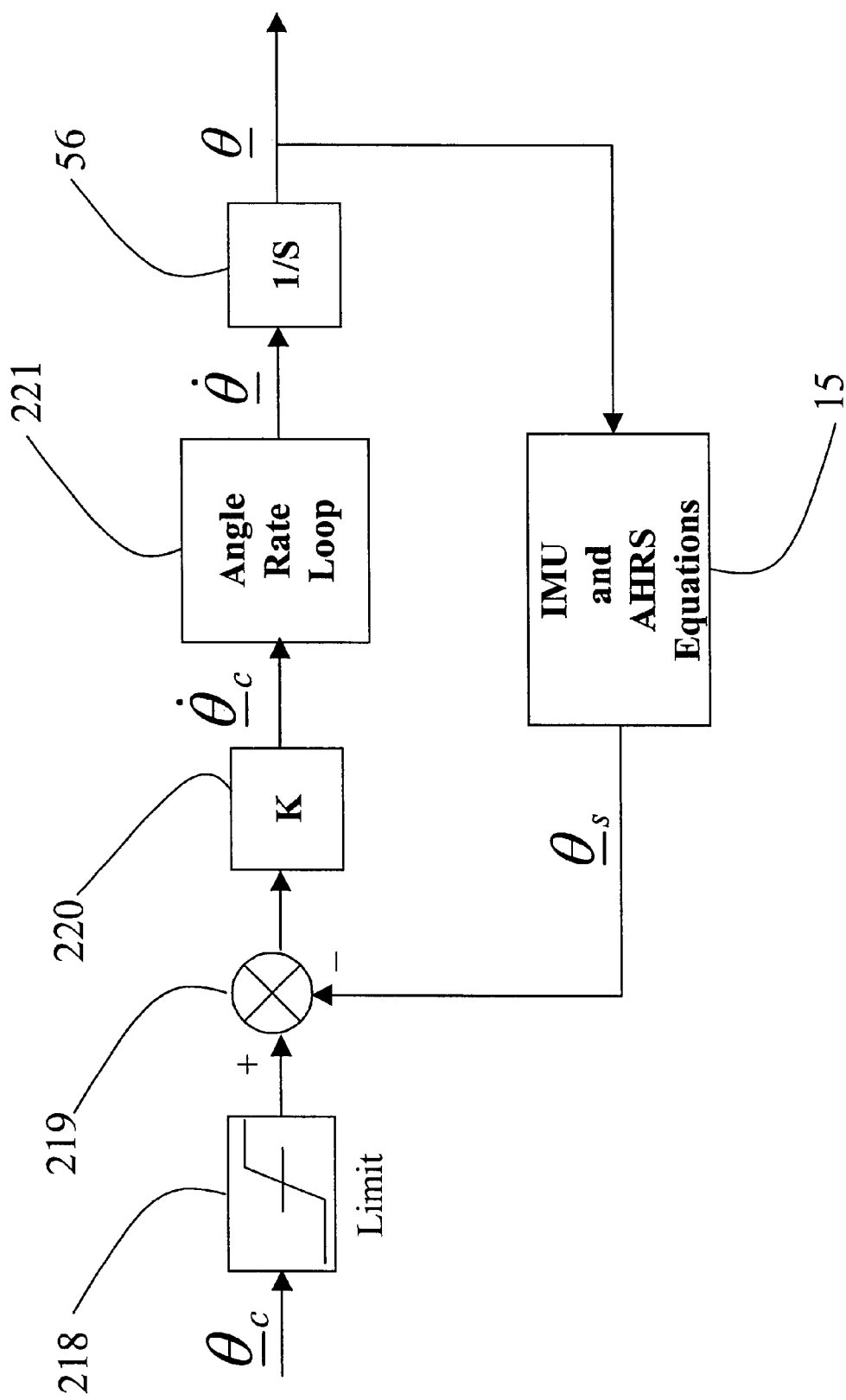
FIG. 8 is a block diagram illustrating an angle loop according to the above preferred embodiment of the present invention.

The angle control loop as shown in FIG. 8 makes use of the angular rate control loop 221 as an inner loop. This is the first order angle position loop as shown in FIG. 8 and is realized entirely within the processing module. With the implementation of this loop, angle is commanded with respect to the fixed base of the machine and is sensed by the combination of the IMU 1 and its AHRS module derived with the constraints of known mechanical limits on the gimbal angles and known gimbal angles on the links closer to the base.

Referring to FIG. 8, the angle control loop comprises the IMU 1 and its AHRS module for obtaining a real angle of the end effector 51, a fifth limit 218 for restricting the magnitude of the angle, a fifth comparator 219 for comparing the angle command and measured angle, and a fifth amplifier 220 for signal amplifying. The angle processing produced data are sent to the angular rate control loop 221 for driving the end effector 51 in which the angle loop acts as an integrator to transform angular rate to angle.

The method of angle control processing comprises following steps:

(1) measuring the angular motion of the end effector 51 by the IMU 1;

(2) processing the output data of the gyros 14 by the AHRS module 15 and producing angle data of the end effector 51;

(3) limiting the input angle command signal by the fifth limit 218 and producing limited angle data;

(4) comparing the limited input angle data with the measured angle from the IMU 1 by the fifth comparator 219 and producing angle error signal;

(5) amplifying the angle error signal by the fifth amplifier 220;

(6) sending the output of the fifth amplifier 220 to the angular rate control loop 221; and (7) producing torque/force by the angular rate control loop 221 that exerts on the end effect and producing angular rate that makes the angle error converges to zero.

The angular rate is accumulated by angle control loop which acts as an integrator and produces the angle. Through the angle control loop, the motion actuator produces force according to the input signal and drives the end effector 51 so that the angle error converges to zero.

Figure 9:
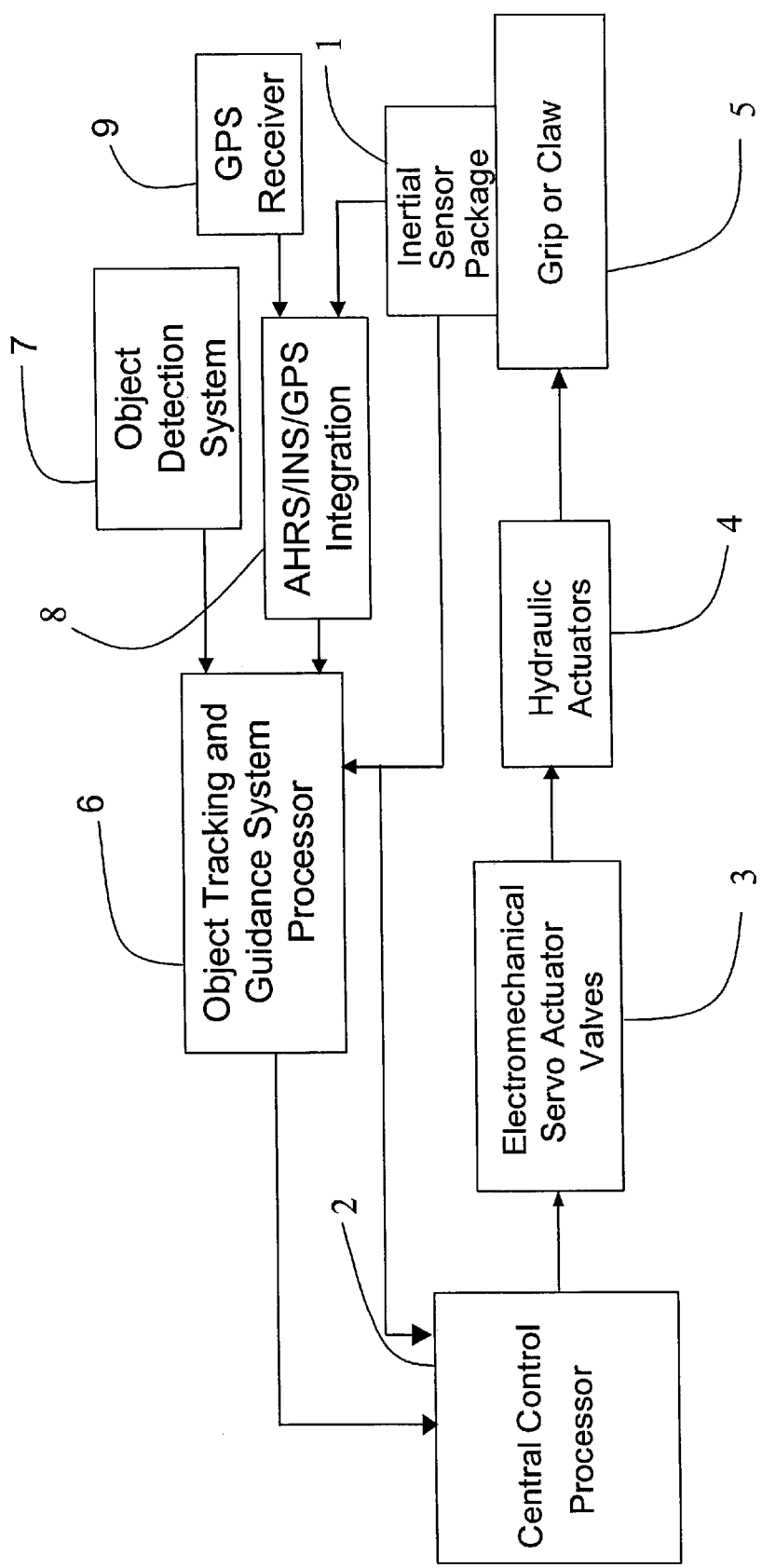
FIG. 9 is a block diagram illustrating a generic system configuration according to a preferred embodiment of the present invention incorporating object detection system and object tracking and guidance system processor.

As shown in FIG. 9, the object detection system 7 ascertains the object presence and position and motion information imparted by the AHRS/INS/GPS Integration Unit 8 with GPS Receiver 9 as input. Object presence and position/motion information is provided to the object tracking and guidance processor system 6 that generates the guidance commands to the central control processor 2.

Figure 10:
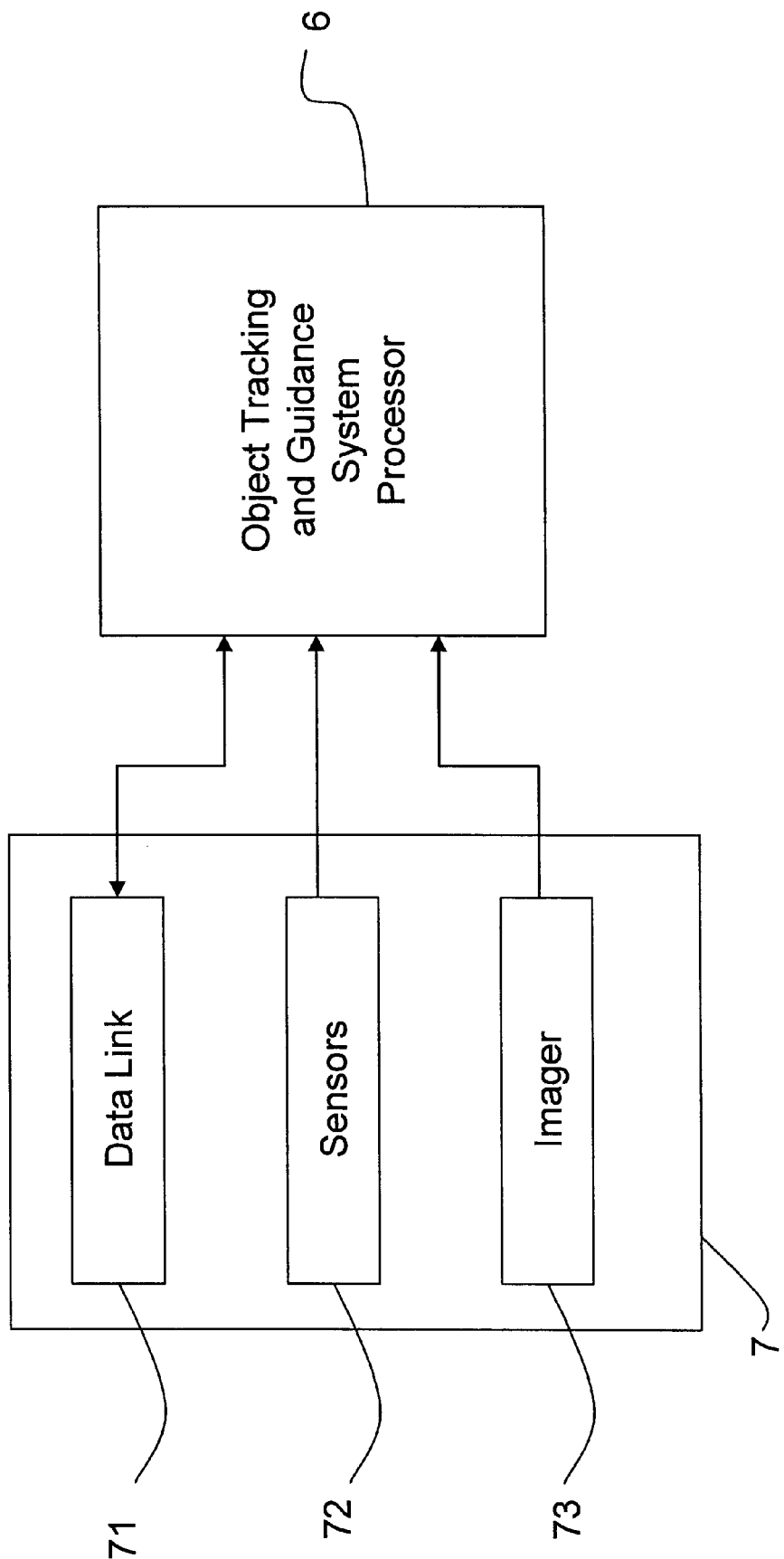
FIG. 10 is a block diagram illustrating the object detection system which can be a data link, or sensors or an imager connected to an object tracking and guidance system processor according to the above preferred embodiment of the present invention.

Referring to FIG. 10, the object detection system 7 can be a data link 71, or sensors 72 or an imager 73. The sensors 72 include radar, laser, laser ranger, ladar, sonar, infrared, video, stereo cameras and acoustic sensor which can execute full/partial coverage of the surrounding views.

The imager 73 can be a passive and/or active imager, including laser scanner, a LDRI (laser dynamic range sensor), etc., imager.

Figure 11:
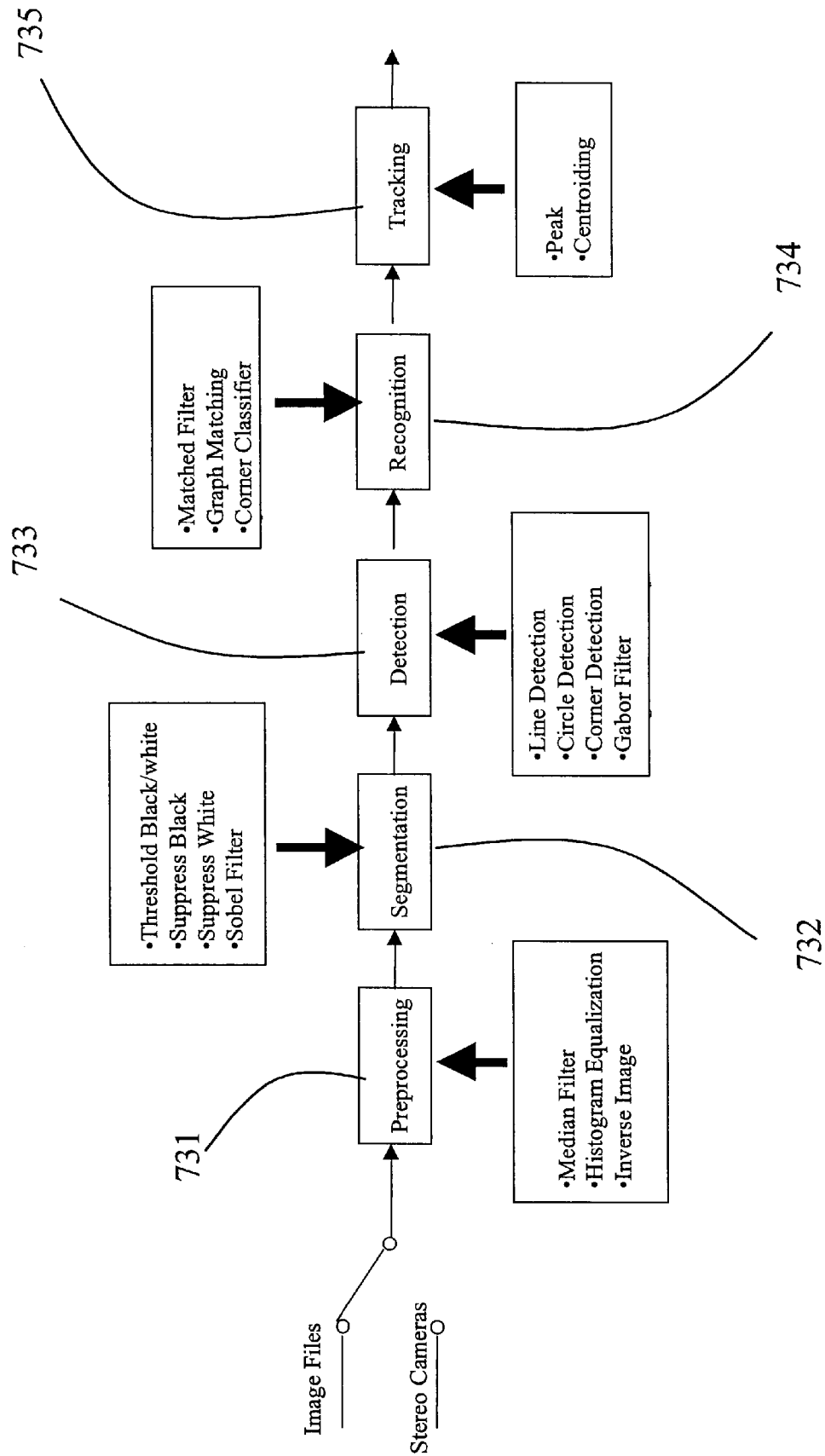
FIG. 11 is a configuration of an example of the precise position determination implementation according to the above preferred embodiment of the present invention.

An "AGNC" Vision Software, as shown in FIG. 11, combines the complete algorithmic suite from detection to recognition/tracking. Input from two cameras (i.e., stereo cameras) can be processed to detect the features on both camera images and calculate the range using feature disparities between the two images and known camera resolution, focal length, and baseline.

As a rule of thumb, the above stereo cameras system can range up to 10× of the minimum ranging distance. Since 3 camera inputs can be simultaneous accommodated, a 3-camera system can also be configured (if needed) to provide accurate ranging at close-up and extended ranges.

Close-up ranging can be accomplished by establishing stereo correspondence for either the camera 1 and camera 2 pair or the camera 2 and camera 3 pair. At longer ranges, the camera 1 and camera 3 pair (which has twice the baseline distance) can be employed. By selecting a desired pair of camera inputs for processing, the "AGNC" Vision Software (which is set up for 2 simultaneous camera inputs) can be applied to this 3-camera configuration as well. In this scheme, different sequences of operations can be employed to achieve reliable object detection, recognition, and tracking for various types of images. The user specifies the algorithms to be executed at various steps of the integrated object detection, recognition and tracking system.

The method of image processing comprises the following steps:

(1) Preprocess the images from stereo cameras or image files to get rid of noise or enhance the features by the preprocessing module 731 using Median Filter, Histogram Equalization and Inverse Image.

(2) Perform segmentation to get the profile of the objects by the segmentation module 732 using Threshold Black/white, Suppress Black, Suppress White and Sobel Filter.

(3) Detect certain object by detection module 733 using Line Detection, Circle Detection, Corner Detection and Gabor Filter.

(4) Perform recognition by recognition module 734 using Match Filter, Graph Matching and Corner Classifier.

(5) Tracking certain object by tracking module 735 using Peak Tracking or Centroiding Tracking.

Figure 12:
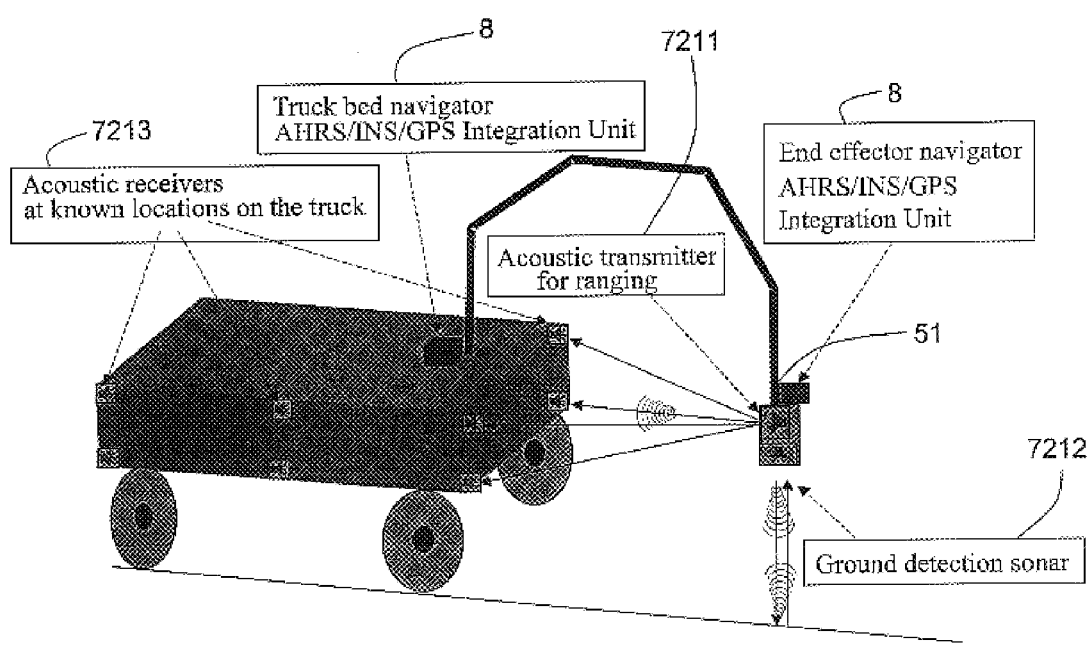
FIG. 12 is a functional block diagram of the smart crane precise position determination system according to the above preferred embodiment of the present invention.
Figure 13:
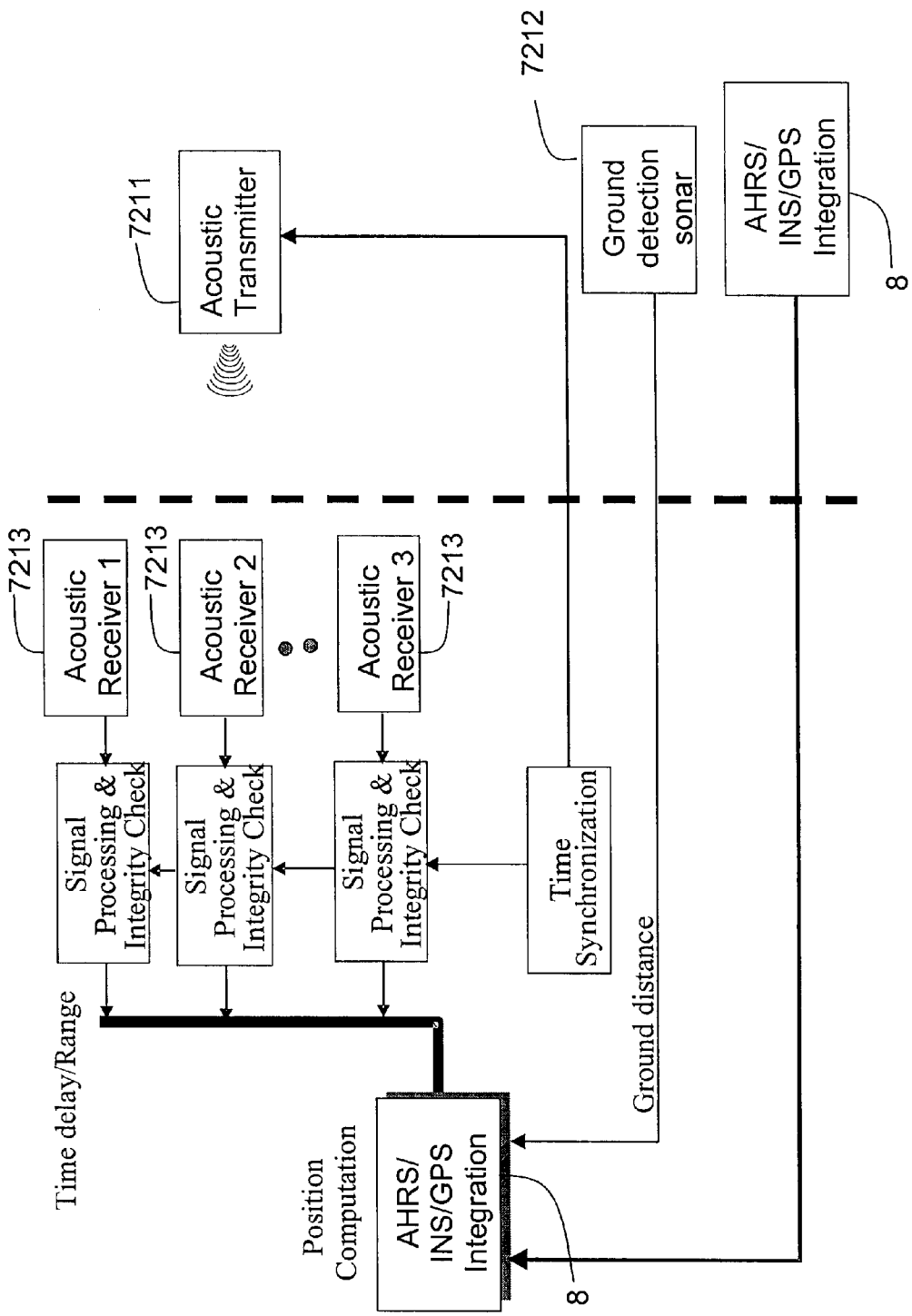
FIG. 13 is the body-fixed coordinate system and notation according to the above preferred embodiment of the present invention.
Figure 14:
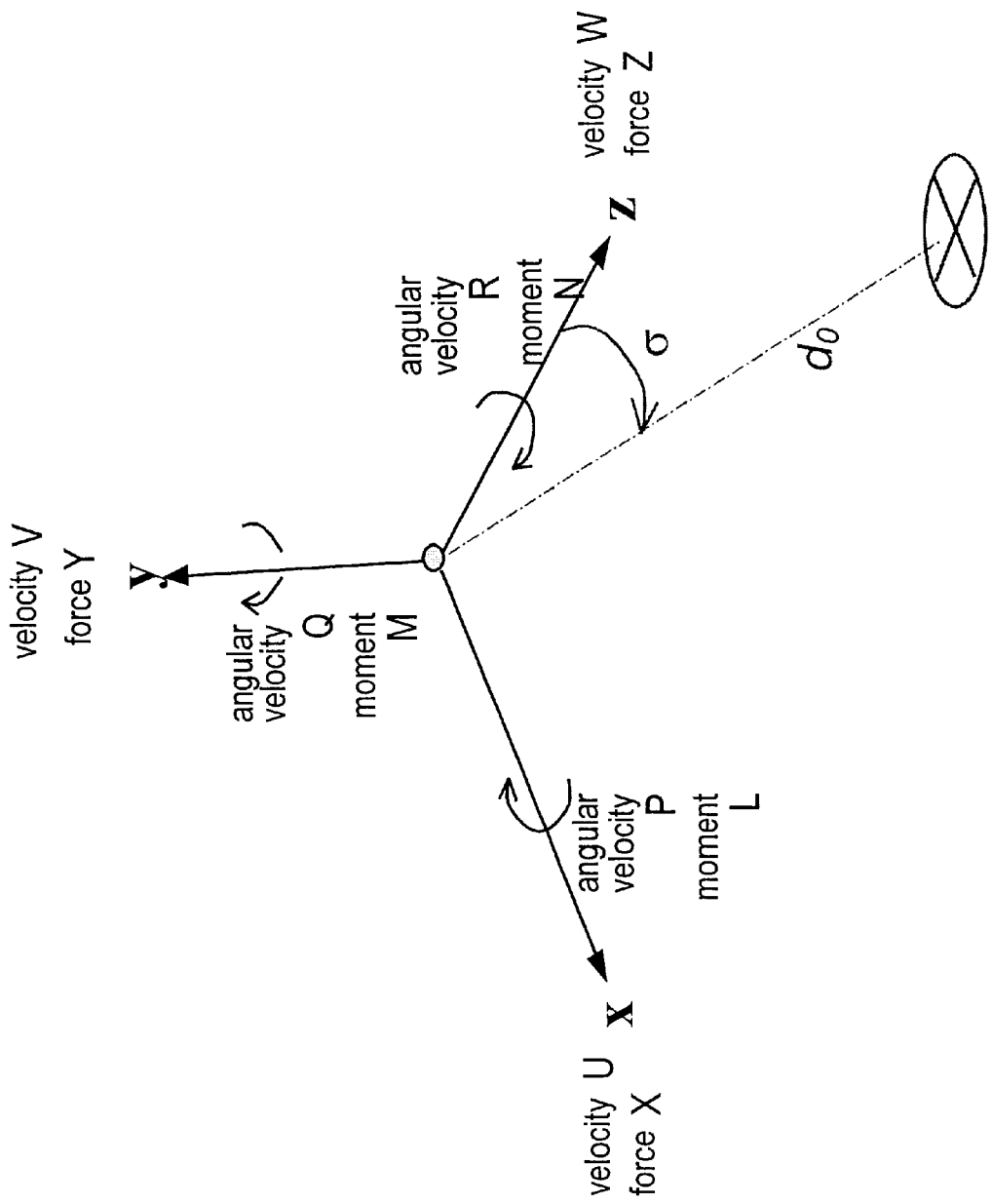
FIG. 14 is a block diagram of the object tracking and guidance system processing according to the above preferred embodiment of the present invention.

As shown in FIG. 12, the AHRS/INS/GPS integration 8 system, such as the AGNC® coremicro® AHRS/INS/GPS Integration Unit, permits integration with a variety of navigation sensors and a suite of advanced algorithms for navigation and control. The high precision tracking and control system takes advantage of this flexibility to encompass diverse sensors by incorporating stereo cameras, laser sensor, acoustic sensor, etc. for providing image tracking and navigation capability thus effecting an enhanced control configuration.

The AHRS/INS/GPS integration 8 system is linked with object detection system 7 cameras, frame grabbers and laptop configuration for image capture and processing. Multiple independent video inputs that work in parallel allow faster image acquisition and consequently more rapid solution update.

Additional capability is provided by utilization of two modules of the AHRS/INS/GPS integration 8 system, one unit installed at the base of the vehicle, providing accurate reference position, and another unit installed on the end effector, as shown in FIG. 12. Using an omni-directional acoustic transmitter 7211 mounted at the end effector 51 and acoustic receivers 7213 fixed on the vehicle, acoustic ranging provides relative range from the transmitter (at the end effector 51) to the receivers mounted on the vehicle. Using the measured range values, both absolute and relative positions of the end effector 51 can be determined.

Position determination of the end effector 51 is based on the triangulation principle. Using 3 or more measured ranges to different reference locations, the XYZ position of the end effector 51 position can be accurately determined. Because the transmitted acoustic ranging signal must be received by at least 3 receivers on the truck bed, multiple receivers should be placed all around the vehicle as shown in FIG. 12. A minimum of 4 receivers on each side (left, right, and back) is desired, and larger baselines imply better accuracy.

This precise position determination system has the following functions:

The acoustic ranging system accurately determines the end effector's relative position with respect to the base.

AHRS/INS/GPS Integration Unit 8 at the end effector 51 provides velocity, acceleration, angular rate, and attitude measurements and relative heading with respect to the base.

Data fusion performed at the AHRS/INS/GPS Integration 8 Unit provides complete, high data-rate measurements of the end effector's 51 motion.

Down-looking sonar at the end effector detects the ground, thus aiding pallet pick-up operations as well as enhancing the safety features.

The acoustic ranging technique uses the time delay of the acoustic signal traveling from the transmitter to the receivers. FIG. 12 depicts the block diagram of the position determination system. The time delay multiplied by the speed of sound is the measured range. For the ground detection sonar, the same acoustic ranging technique is used to detect the ground.

The blending of the AHRS/INS/GPS Integration Unit 8 in a multiple sensor approach exploits the following cues:

Know when you are leveled (e.g., $[a_x a_y a_z]=[0\ 0\ g]$)

Object orientation 7 can be determined from a single-axis laser scan

It can see edge-to-edge, and given prior object dimension, knows whether it is looking at the width or length 1 milli-g accuracy can resolve ground-slope to 0.06° (using IMU as reference)

Know when you are in front (see the holes)

Use camera to ID/locate holes (known orientation/size) and adjust scan-axis (200 pixels across→0.57° roll angle resolution)

Use laser scanner to adjust yaw (1°–2° resolution for 1 m width) to align to the front surface and center along the scan-axis (4.4 mm resolution at 1 meter range)

Use IMU for speedy positioning/orientation servo-loops

Rectangular-box objects

Need to scan from a leveled position to reconstruct a virtual 3D object camera to estimate ground from a camera image)

Need to locate ground (use known alignment with respect to camera to estimate ground from a camera image)

The method and system for universal guidance and control of automated machines incorporates IMU 1 and AHRS/INS 15, stereo cameras, acoustic sensor, etc. The motion can be defined by the axis system shown in FIG. 14.

Information pertaining to the motion of the vehicle center of mass includes forces (X, Y, Z), velocities (U, V, W), moments (L, M, N) and rotation rates (L, M, N). Furthermore, the target-relative position, which defines the specific location of a desired destination can be described relative to the body-fixed axis using line-of-sight angle ($\sigma$) and range (d) information. To provide the necessary guidance signals 6 needed to enable autonomous navigation to a target point, one needs to generate a continuous stream of $[\sigma_x, \dot{\sigma}_x, \sigma_y, \dot{\sigma}_y, d, \dot{d}]$, which must be updated with respect to the vehicle motion. Thus, given the sensing information and processing modules, a universal guidance system is developed to solve a variety of machine automation applications.

To derive continuous updates of guidance signals $[\sigma_x, \dot{\sigma}_x, \sigma_y, \dot{\sigma}_y, d, \dot{d}]$ 6, a suite of object detection system sensor(s)

72, gyros 14, and accelerometers 11 is required. The object detection system sensors 72 provide line-of-sight angle and range information. However, when the target point is not in the field-of-view, continuous propagation of $[\sigma_x, \dot{\sigma}_x, \sigma_y, \dot{\sigma}_y, d, \dot{d}]$ is required—this can be accomplished with gyro 14 and accelerometer 11 measurements. The design provides an integrated solution for deriving the required guidance signals using sensing/processing modules.

The AHRS/INS/GPS Integration Unit 8, integrated with laser, stereo cameras and acoustic sensors provide accurate measurements of line-of-sight angle and range. High-precision gyros 14 and accelerometers 11 are standard aircraft and spacecraft GNC components needed to sense and control the vehicles' motion. Integration of sensor inputs combined with a priori and a posteriori knowledge of the vehicle system parameters, dynamics, and environment achieve accurate guidance solutions needed to guide the vehicle to its destination.

Figure 15:
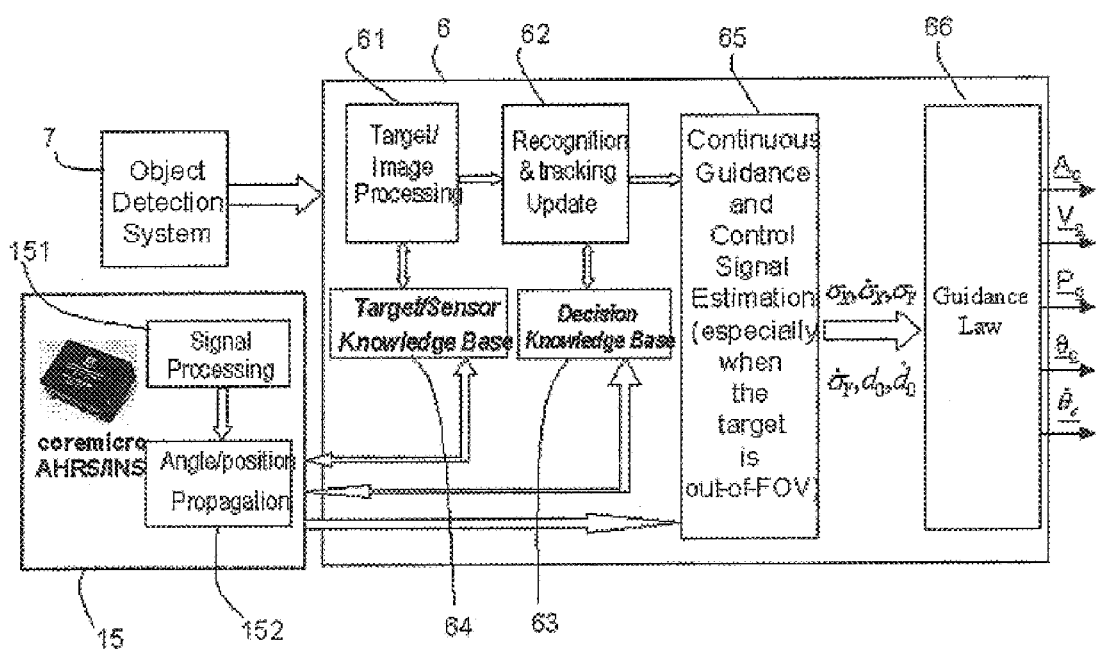
FIG. 15 is a block diagram illustrating the command signals for guidance and control results from the continuous guidance and control estimation according to the above preferred embodiment of the present invention.

As shown in FIG. 15, the command signals for guidance and control results from the continuous guidance and control estimation 65. Target image processing 61 interfaces with the Target/Sensor Knowledge Base 64 to enhance the probability of target detection while the Recognition & Tracking Update 62 interfaces with the Decision Knowledge Base 63 to ascertain the characteristics of the target allowing its recognition and accurate tracking of its motion.

Referring to FIG. 15, the generic command signals for guidance and control from the continuous guidance and control estimation 65 are fed into a guidance law module 66. The generic command signals are further processed by the guidance law module 66: to produce specific commands for the motion controllers or control loops. The guidance law module 66 is a generic processing module and it can be configured to produce different control commands depending on application requirements. As a example, the guidance law module 66 produces 5 command signals for the motion controllers or control loops: acceleration commands $A_c$ for acceleration control loop 29; velocity commands $V_c$ for velocity control loop 213; position commands $P_c$ for position control loop (FIG. 6); angular rate commands $\dot{\theta}_c$ for angular rate control loop 221; and angular position (angle) commands $\theta_c$ for angular position control loop (FIG. 8).

The features of the present invention are summarized as follows:

1. An IMU, such as the above mentioned AGNC®-2000CMIMU coremicro® IMU is used to provide data to greatly decrease operational time through the stabilization of the effector with respect to an earth fixed frame. Operational time can be minimized by doing trajectory planning which makes use of the motion state data. Stabilization and isolation of the effector from external motion disturbances can be achieved through the use of inertial data determined actuator response.

2. After achieving stabilized response of the effector, the operator no longer needs to be as closely involved in the motions of the crane. He can input commands that are structured for semiautonomous/autonomous operation.

3. Performance enhancement can be achieved without upgrading other costly components. By more closely monitoring effector motions, less costly linear and angular direct motion sensors can be utilized.

4. Important safety monitoring can be achieved by comparing the short term navigation solution derived from the inertial sensors with the position and velocity estimates derived from the mechanical sensors. This navigation solution will be very accurate over short two second intervals. When the two solutions differ by more than a small amount, the, system can be shut down.

5. After forming a navigation solution, data is available for the operator's use in directing the machine.

6. Once navigation data is available, it can be stored into a data base each time an item of cargo is handled so that the geographic location of cargo can be retained for future reference.

7. Orientation of cargo can be determined by resolving optical image data into an earth fixed navigation frame of reference.

8. After the implementation of control loops with other existing system components, cargo mass can be determined by measuring loop time constants. This information can be used to schedule gains in order to optimize performance.

9. By making use of preexisting navigation data, collision avoidance can be realized.

10. Operation of the crane in a semiautonomous/autonomous mode is possible while the machine makes small maneuvering motions.

11. Further performance enhancement is achieved with the use of the object detection system that ascertains the presence of object(s) and position and motion information from an integrated navigation system which provides the information to the guidance processor system that, in turn, generates the guidance commands allowing accurate tracking of the detected object and precise execution of the desired motion trajectory.

12. The system also achieves important safety monitoring by comparing the short term navigation solution derived from the inertial sensors with the position and velocity estimates derived from the mechanical sensors. This navigation solution is very accurate over short time intervals. When the two solutions differ by more than a small amount, the system can be shut down.

What is claimed is:

1. A system for universal guidance and control of an automated machine comprising a motion element having an end effector, wherein said system comprises:

an inertial sensor package, which is installed at said end effector of said motion element, sensing a motion and motion changes of said end effector and providing a motion measurement of said end effector through a navigation processing of said inertial sensor package to obtain measurement data;

a GPS receiver for providing GPS positioning measurements;

an AHRS/INS/GPS integration system receiving said motion measurement of said motion element and said GPS positioning measurements for imparting position and motion information;

an object detection system for ascertaining object presence;

an object tracking and guidance system processor receiving an information on a presence of objects of interest from said object detection system and a position and motion information from said AHRS/INS/GPS integration system to produce a guidance command as a command input to said central control processor;

a central control processor receiving said measurement data from said inertial sensor package, said position and motion information from said AHRS/INS/GPS integration system, and an output of said object tracking and guidance system processor, and comparing said measurement data with said command input to form error data which is received in said central control processor to produce a control signal in said central control processor; and a motion actuator receiving said control signal from said central control processor to control speed force outputs of said motion actuator and driving said end effector of said motion element by said motion actuator according to said control signal, wherein errors between said motion being measured and said command input converges to zero, so as to ensure said end effector of said motion element moves along a trajectory as said command input requires.

2. The system, as recited in claim 1, wherein said motion actuator includes one or more electromechanical servo actuator valves and one or more hydraulic actuators which are controlled by said electromechanical servo actuator valves, wherein said central control processor receives output of said inertial sensor package and produces commands to said electromechanical servo actuator valves to control said hydraulic actuators for making said motion element move.

3. The system, as recited in claim 2, wherein said control signal is sent to said electromechanical servo actuator valves to control a hydraulic flow to said hydraulic actuators so as to control speed and force outputs of said hydraulic actuators.

4. The system, as recited in claim 3, wherein said end effector of said motion element is driven by said hydraulic actuators according to said control signal.

5. The system, as recited in claim 1, further comprising an acceleration control loop which comprises one accelerometer of said inertial sensor package to measure real motion, a converter converting delta velocity data to acceleration data, a first limit restricting said magnitude of said force, a first comparator comparing said acceleration command and measured acceleration, a first amplifier for signal amplifying, and an integrator for signal interation, wherein a produced voltage signal is sent to said motion actuator for driving said end effector.

6. The system, as recited in claim 5, wherein said accelerometer of said inertial sensor package measures an acceleration of said end effector and produces said delta velocity data, wherein said delta velocity data is sent to said converter in said central control processor to convert to said acceleration data, wherein said acceleration data is inputted in said first limit so as to limit said acceleration data and produce acceleration commands which are compared with said measured acceleration to produce an acceleration error signal by said first comparator, wherein said acceleration error signal is simplified by said first amplifier to form an amplified signal which is then integrated by said integrator, wherein an output of said integrator is converted to an analog voltage signal which is sent to said motion actuator to produce force according to said analog voltage signal by said motion actuator to drive said end effector to move while said acceleration error converges to zero.

7. The system, as recited in claim 6, further comprising a velocity control loop which makes use of said acceleration control loop as an inner control loop, wherein said velocity processing control loop comprises said inertial sensor package and a navigation module thereof for obtaining a real velocity of said end effector, a second limit for restricting said magnitude of said velocity, a second comparator for comparing a velocity command and said measured velocity, and a second amplifier for signal amplifying, wherein velocity processing produced data are sent to said acceleration control loop as said input acceleration command for driving said end effector, wherein said velocity control loop acts as an integrator to transform acceleration to velocity.

8. The system as recited in claim 7, wherein said velocity of said end effector is measured by said navigation module in said inertial sensor package, wherein output data of said inertial sensor package is processed by using said navigation module to produce velocity measurement of said end effector, wherein an input velocity signal is limited by said second limit to produce limited velocity data wherein said limited velocity data is compared with said measured velocity from said inertial sensor package by said second comparator to produce a velocity error signal, wherein said velocity error signal is amplified by said second amplifier, wherein an output of said second amplifier is sent to an input of said acceleration control loop to produce force by said motion actuator according to said input signal, wherein through said acceleration control loop and driving to said end effector said motion is generated while said velocity error converges to zero.

9. The system as recited in claim 8, further comprising a position control loop which makes use of said velocity control loop as an inner loop wherein said position processing loop comprises said inertial sensor package and a processing for obtaining a real position of said end effector, a third limit for restricting said magnitude of said position, a third comparator for comparing said position command and measured position, and a third amplifier for error signal amplifying, wherein position processing produced data are sent to said velocity control loop as an input velocity command for driving said end effector in which said position loop acts as an integrator to transform velocity to position.

10. The system, as recited in claim 9, wherein a position of said end effector is measured by said inertial sensor package so as to estimate said position by using a fixed lever arm parameter of said inertial sensor package, wherein said output data of said inertial sensor package is processed to produce a position measurement of said end effector, wherein said position measurement is limited by said third limit to produce limited position data, wherein said limited position data is compared with said measured position from said inertial sensor package by said third comparator to produce a position error signal which is amplified by said third amplifier, wherein an output of said third amplifier is sent to an input of said velocity control loop, wherein through said velocity control loop, said motion actuator produces force according to said input signal and drives said end effector to move while said position error converges to zero.

11. The system as recited in claim 10, further comprising an angular rate control loop; which comprises said inertial sensor package and gyros thereof for obtaining a real angular rate of said end effector, a fourth limit for restricting a magnitude of an angular rate, a fourth comparator for comparing said angular rate command and measured angular rate, and a fourth amplifier for signal amplifying, wherein angular rate processing produced data are sent to said end effector for driving said end effector, wherein said angular rate control loop acts as an integrator to transform angular acceleration to said angular rate.

12. The system, as recited in claim 11, wherein an angular motion of said end effector is measured by said gyros in said inertial sensor package to output angular data in forms of delta angles, wherein said delta angle data is converted by an angular rate converter to angular rate data which is limited by said fourth limit to limited angular rate data, wherein said limited angular rate data in compared with said measured angular rate from said angular rate converter by said fourth comparator to produce an angular rate error signal, wherein said angular rate error signal is amplified by said fourth amplifier, wherein an output of said fourth amplifier is converted to analog signal and sent to said input of said motion actuator to produce torque and force that exerts on said end effect by said motion actuator and produce an angular acceleration that makes said angular rate error converges to zero, wherein said angular acceleration is accumulated by said angular rate control loop to produce said angular rate.

13. The system, as recited in claim 12, further comprising an angle control loop which makes use of said angular rate control loop as an inner loop, wherein said angle control loop comprises said inertial sensor package and an AHRS (Altitude. Heading Reference System) module for obtaining a real angle of said end effector, a fifth limit for restricting said magnitude of said angle a fifth comparator for comparing said angle command and measured angle, and a fifth amplifier for signal amplifying, wherein angle processing produced data are sent to said angular rate control loop for driving said end effector in which said angle loop acts as an integrator to transform said angular rate to angle.

14. The system, as recited in claim 13, wherein an angular motion of said end effector is measured by said inertial sensor package, wherein output data of said gyros is processed by said AHRS (Altitude Heading Reference System) module to produce angle data of said end effector which is limited by said fifth limit to produces limited angle data, wherein said limited angle data is compared with said measured angle from said inertial sensor package by said fifth, wherein an output of said fifth amplifier is sent to said angular rate control loop to produce a torque and force by said angular rate control loop that exerts on said end effect and produces said angular rate that makes an angle error converges to zero.

15. The system, as recited in claim 1, further comprising an angular rate control loop which comprises said inertial sensor package and gyros thereof for obtaining a real angular rate of said end effector, a fourth limit for restricting a magnitude of an angular rate, a fourth comparator for comparing said angular rate command and measured angular rate, and a fourth amplifier for signal amplifying, wherein angular rate processing produced data are sent to said end effector for driving said end effector, wherein said angular rate control loop acts as an integrator to transform angular acceleration to said angular rate.

16. The system, as recited in claim 15, wherein an angular motion of said end effector is measured by said gyros in said inertial sensor package to output angular data in form of delta angles, wherein said delta angle data is converted by an angular rate converter to angular rate data which is limited by said fourth limit to form limited angular rate data, wherein said limited angular rate data in compared with said measured angular rate from said angular rate converter by said fourth comparator to produce an angular rate error signal, wherein said angular rate error signal is amplified by said fourth amplifier, wherein an output of said fourth amplifier is converted to an analog signal and sent to said input of said motion actuator to produce torque and force that exerts on said end effector by said motion actuator and produces an angular acceleration that makes said angular rate error converges to zero, wherein said angular acceleration is accumulated by said angular rate control loop to produce said angular rate.

17. The system, as recited in claim 16, farther comprising an angle control loop which makes use of said angular rate control loop as an inner loop, wherein said angle control loop comprises said inertial sensor package and an AHRS (Altitude Heading Reference System) module for obtaining a real angle of said end effector, a fifth limit for restricting said magnitude of said angle, a fifth comparator for comparing said angle command and measured angle, and a fifth amplifier for signal amplifying, wherein angle processing produced data are sent to said angular rate control loop for driving said end effector in which said angle loop acts as an integrator to transform said angular rate to angle.

18. The system as recited in claim 17, wherein an angular motion of said end effector is measured by said inertial sensor package, wherein output data of said gyros is processed by said AHRS (Altitude Heading Reference System) module to produce angle data of said end effector which is limited by said fifth limit to produces limited angle data, wherein said limited angle data is compared with said measured angle from said inertial sensor package by said fifth comparator to produce an angle error signal which is amplified by said fifth amplifier, wherein an output of said fifth amplifier is sent to said angular rate control loop to produce a torque and force by said angular rate control loop that exerts on said end effector and produces said angular rate that makes an angle error converges to zero.

19. The system, as recited in claim 1, further comprising:
 a second AHRS/INS/GPS integration system, installed at a base of a vehicle, providing an accurate reference position;
 acoustic receivers affixed at known locations on said vehicle;
 an acoustic transmitter mounted at said end effector, providing relative range from said acoustic transmitter (at said end effector) to said acoustic receivers mounted on said vehicle, wherein both absolute and relative positions of said end effector are determined using said measured range values; and
 a down-looking sonar at said end effector, detecting ground, thus aiding pallet pick-up operations as well as enhancing safety features.

20. The system, as recited in claim 19, wherein said acoustic transmitter is an omni-directional device.

21. The system, as recited in claim 19, wherein a plurality of receivers are placed around said vehicle and a position determination of said end effector is based on a triangulation principle, using three or more measured ranges to different reference locations, wherein larger baselines imply better accuracy.

22. The system, as recited in claim 21, wherein acoustic ranging uses a time delay of an acoustic signal traveling from said acoustic transmitter to said acoustic receivers.

23. The system, as recited in claim 19, wherein said object detection system is a data link.

24. The system, as recited in claim 19, wherein said object detection system is selected from a group consisting of an imager, including laser scanner, and a LDRI (laser dynamic range sensor).

25. The system, as recited in claim 24, wherein said stereo cameras comprises two cameras and a vision software, combining a complete algorithmic suite from detection to recognition/tracking, wherein input from said two cameras is processed to detect the features on both camera images and calculate the range using feature disparities between the two images and known camera resolution, focal length, and baseline.

26. The system, as recited in claim 24, wherein by selecting a desired pair of camera inputs for processing, said vision software which is set up for two simultaneous camera inputs is applied to a 3-camera configuration.

27. The system, as recited in claim 24, wherein said stereo cameras further comprises first, second and third cameras and a vision software, combining a complete algorithmic suite from detection to recognition/tracking, wherein input from said three cameras is processed to detect the features on both camera images and calculate the range using feature disparities between the two images and known camera resolution, focal length, and baseline, wherein 3 camera inputs are simultaneous accommodated and a 3-camera system is selectively configured to provide accurate ranging at close-up and extended ranges, wherein close-up ranging is accomplished by establishing stereo correspondence for either said first camera and said second camera in pair or said second camera and said third camera in pair; at longer ranges, said first camera and said third camera in pair which has a twice baseline distance are employed.

28. The system, as recited in claim 19, wherein said object detection system is a sensor selected from a group consisting of radar, laser, ladar, sonar, infrared, video, stereo cameras, and acoustic sensor, which is capable of executing full/partial coverage of the surrounding views.

29. The system, as recited in claim 28, wherein by selecting a desired pair of camera inputs for processing, said vision software which is set up for two simultaneous camera inputs is applied to a 3-camera configuration.

30. The system, as recited in claim 1, wherein said object detection system is a data link.

31. The system, as recited in claim 1, wherein said object detection system is selected from a group consisting of an imager, including laser scanner, and a LDRI (laser dynamic range sensor).

32. The system, as recited in claim 31, wherein said stereo cameras comprises two cameras and a vision software, combining a complete algorithmic suite from detection to recognition/tracking, wherein input from said two cameras is processed to detect the features on both camera images and calculate the range using feature disparities between the two images and known camera resolution, focal length, and baseline.

33. The system, as recited in claim 31, wherein said stereo cameras further comprises first, second and third cameras and a vision software, combining a complete algorithmic suite from detection to recognition/tracking, wherein input from said three cameras is processed to detect the features on both camera images and calculate the range using feature disparities between the two images and known camera resolution, focal length, and baseline, wherein 3 camera inputs are simultaneous accommodated and a 3-camera system is selectively configured to provide accurate ranging at close-up and extended ranges, wherein close-up ranging is accomplished by establishing stereo correspondence for either said first camera and said second camera in pair or said second camera and said third camera in pair; at longer ranges, said first camera and said third camera in pair which has a twice baseline distance are employed.

34. The system, as recited in claim 1, wherein said object detection system is a sensor selected from a group consisting of radar, laser, ladar, sonar, infrared, video, stereo cameras, and acoustic sensor, which is capable of executing full/partial coverage of the surrounding views.

35. The system, as recited in claim 1, wherein said object tracking and guidance system processor is further implemented, wherein command signals for guidance and control results from a continuous guidance and control estimation, target image processing interfaces with Target/Sensor Knowledge Base to enhance probability of target detection while Recognition & Tracking Update interfaces with Decision Knowledge Base to ascertain characteristics of said target allowing its recognition and accurate tracking of its motion, wherein said generic command signals for guidance and control from said continuous guidance and control estimation are fed into a guidance law module, wherein said generic command signals are further processed by a guidance law module to produce specific commands for motion controllers or control loops.

36. The system, as recited in claim 35, wherein said guidance law module further produces five command signals for the motion controllers or control loops, acceleration command for acceleration control loop, velocity command for velocity control loop; position command for position control loop; angular rate command for angular rate control loop, and angular position (angle) command for angular position control loop.

37. A method of universal guidance and control of an automated machine which comprises a motion element having an end effector, wherein said method comprises the steps of:

(a) sensing a motion and motion changes of said end effector of said motion element by an inertial sensor package installed at said end effector to form inertial measurement data;

(b) providing an accurate motion measurement of said end effector of said motion element through an AHRS/INS/GPS integration system by said inertial sensor package and a GPS receiver;

(c) sending said inertial measurement data from said inertial sensor package to a central control processor; sending said accurate motion measurement from said AHRS/INS/GPS integration system to said central control processor, producing an object presence and position and motion information by an object detection system and an object tracking and guidance system processor to form a command input for said central control processor;

(d) receiving said inertial measurement data from said inertial sensor package by said central control processor; receiving said accurate motion measurement from said AHRS/INS/GPS integration system, and receiving said object presence and position and motion information from said object detection system and said object tracking and guidance system processor by said central control processor;

(e) comparing said measurement data with said command input to form error data;

(f) receiving said error data in said central control processor;

(h) producing a control signal by using a controller algorithm in said central control processor;

(i) sending said control signal to a motion actuator to control speed and force outputs of motion actuator; and (j) driving said end effector of said motion element by said motion actuator according to said control signal, wherein an error between said measured motion and said command input of said motion actuator converges to zero, so as to ensure said end effector of said motion element moves along a trajectory as said command input requires.

38. The method, as recited in claim 37, wherein said motion actuator comprises one or more hydraulic actuators and one or more electromechanical servo valves, wherein said control signal is sent to said electromechanical servo actuator valves to control a hydraulic flow to said hydraulic actuators so as to control speed and force outputs of said hydraulic actuators.

39. The method, as recited in claim 37, further comprising an acceleration control loop which comprises the steps of:
(a.1) measuring an acceleration of said end effector and producing delta velocity data by an accelerometer provided in said inertial sensor package;
(a.2) sending said delta velocity data to a converter in said central control processor;
(a.3) converting said delta velocity data to acceleration data;
(a.4) inputting and limiting said acceleration data with a first limit and producing limited acceleration commands;
(a.5) comparing each of said limited acceleration commands with said measured acceleration and producing an acceleration error signal by a first comparator;
(a.6) simplifying said acceleration error signal by a first amplifier and then integrating said amplified signal by an integrator;
(a.7) converting an output of said integrator to an analog voltage signal and sending said analog voltage signal to said motion actuator; and
(a.8) producing a force according to said analog voltage signal by said motion actuator and driving said end effector to move while an acceleration error converges to zero.

40. The method, as recited in claim 39, further comprising a velocity control loop which makes use of said acceleration control loop as an inner control loop, wherein said velocity control comprises the steps of:
(b.1) measuring a velocity of said end effector by a navigation module of said inertial sensor package;
(b.2) processing said output data of said inertial sensor package by using said navigation and producing velocity measurements of said end effector;
(b.3) limiting said velocity measurements by a second limit and producing limited velocity data;
(b.4) comparing said limited velocity data with said measured velocity from said inertial sensor package by a second comparator and producing a velocity error;
(b.5) amplifying said velocity error signal by a second amplifier;
(b.6) sending an output of said second amplifier to an input of said acceleration control loop; and
(b.7) producing a force by said motion actuator according to said input signal, wherein through said acceleration control loop and driving to said end effector, a motion is generated while said velocity error converges to zero.

41. The method, as recited in claim 40; further comprising a position control loop which makes use of said velocity control loop as an inner loop, wherein said position control loop comprises the steps of:
(c.1) measuring a position of said end effector by said inertial sensor package
(c.2) estimating said position by using a fixed lever arm parameter;
(c.3) processing said output of said inertial sensor package by using navigation algorithms and producing a position measurement of said end effector;
(c.4) limiting said position measurement by a third limit and producing limited position data;
(c.5) comparing said limited position data with said measured position from said inertial sensor package by a third comparator and producing a position error signal;
(c.6) amplifying said position error signal by a third amplifier; and
(c.7) sending an output of said third amplifier to an input of said velocity control loop, wherein through said velocity control loop, said motion actuator produces a force to drive said end effector to move while said position error converges to zero.

42. The method, as recited in claim 41, further comprising an angular rate control loop which comprises the steps of:
(d.1) measuring an angular motion of said end effector by gyros provided in said inertial sensor package;
(d.2) outputting angular data of said gyros in form of delta angles;
(d.3) converting said delta angle data to angular rate data by an angular rate converter;
(d.4) limiting said angular rate data by a fourth limit and producing limited angular rate data;
(d.5) comparing said limited angular rate data with said measured angular rate from said angular rate converter by a fourth comparator and producing an angular rate error signal;
(d.6) amplifying said angular rate error signal by a fourth amplifier;
(d.7) converting an output of said fourth amplifier to an analog signal and sending said analog signal to an input of said motion actuator; and
(d.8) producing a torque and force that exerts on said end effect by said motion actuator and producing an angular acceleration that makes said angular rate error converges to zero.

43. The method, as recited in claim 42, further comprising an angle control loop which makes use of said angular rate control loop as an inner loop, wherein said angle control loop comprises the steps of:
(e.1) measuring an angular motion of said end effector by said inertial sensor package;
(e.2) processing said output data of said gyros by an AHRS (Altitude Heading Reference System) module provided in said inertial sensor package and producing angle data of said end effector;
(e.3) limiting said angle data by a fifth limit and producing limited angle data;
(e.4) comparing said limited angle data with said measured angle from said inertial sensor package by a fifth comparator and producing an angle error signal;
(e.5) amplifying said angle error signal by a fifth amplifier;
(e.6) sending an output of said fifth amplifier to said angular rate control loop; and
(e.7) producing a torque and force by said angular rate control loop that exerts on said end effect and producing an angular rate that makes said angle error converges to zero.

44. The method, as recited in claim 37, further comprising an angular rate control loop which comprises the steps of:
(d.1) measuring an angular motion of said end effector by gyros provided in said inertial sensor package;
(d.2) outputting angular data of said gyros in form of delta angles;
(d.3) converting said delta angle data to angular rate data by an angular rate converter;
(d.4) limiting said angular rate data by a fourth limit and producing, limited angular rate data;

(d.5) comparing said limited angular rate data with said measured angular rate from said angular rate converter by a fourth comparator and producing an angular rate error signal;

(d.6) amplifying said angular rate error signal by a fourth amplifier;

(d.7) converting an output of a fourth amplifier to an analog signal and sending said analog signal to an input of said motion actuator; and (d.8) producing a torque and force that exerts on said end effect of said motion actuator and producing an angular acceleration that makes said angular rate error converges to zero.

45. The method, as recited in claim 44, further comprising an angle control loop which makes use of said angular rate control loop as an inner loop, wherein said angle control loop comprises the steps of:

(e.1) measuring an angular motion of said end effector by said inertial sensor package;

(e.2) processing said output data of said gyros by an AHRS (Altitude Heading Reference System) module provided in said inertial sensor package and producing angle data of said end effector;

(e.3) limiting said angle data by a fifth limit and producing limited angle data;

(e.4) comparing said limited angle data with said measured angle from said inertial sensor package by a fifth comparator and producing an angle error signal;

(e.5) amplifying said angle error signal by a fifth amplifier;

(e.6) sending an output of said fifth amplifier to said angular rate control loop; and (e.7) producing a torque and force by said angular rate control loop that exerts on said end effect and producing an angular rate that makes said angle error converges to zero.

46. The method, as recited in claim 37 wherein said object presence is produced by two stereo cameras and the step (d) further comprises:

(d.1) preprocessing images from either said stereo cameras or image files to get rid of noise and enhance features thereof by a preprocessing module;

(d.2) performing segmentation to get a profile of said objects by a segmentation module;

(d.3) detecting a certain object by a detection module, (d.4) performing recognition by a recognition module, and (d.5) tracking said certain object by a tracking module.

47. The method, as recited in claim 46, wherein said preprocessing module is implemented by one or more of Median Filter, Histogram Equalization and Inverse Image.

48. The method, as recited in claim 46, wherein said segmentation module is implemented by one or more of Threshold Black/white, Suppress Black, Suppress White and Sobel Filter.

49. The method, as recited in claim 46, wherein said detection module is implemented by one or more of Line Detection, Circle Detection, Corner Detection and Gabor Filter.

50. The method, as recited in claim 46, wherein said recognition module is implemented by one or more of Match Filter, Graph Matching and Corner Classifier.

51. The method, as recited in claim 46, wherein said tracking module is implemented Peak Tracking or Centroiding Tracking.

* * * * *